United States Patent
Kim

(10) Patent No.: US 10,880,004 B2
(45) Date of Patent: Dec. 29, 2020

(54) VARIABLE WAVELENGTH FILTER, AND LIGHT RECEIVER AND LIGHT RECEIVING METHOD USING VARIABLE WAVELENGTH FILTER

(71) Applicant: Jeong-Soo Kim, Sejong (KR)

(72) Inventor: Jeong-Soo Kim, Sejong (KR)

(*) Notice: Subject to any disclaimer, the term of this patent is extended or adjusted under 35 U.S.C. 154(b) by 0 days.

(21) Appl. No.: 16/345,915

(22) PCT Filed: Oct. 31, 2017

(86) PCT No.: PCT/KR2017/012182
§ 371 (c)(1),
(2) Date: Apr. 29, 2019

(87) PCT Pub. No.: WO2018/084541
PCT Pub. Date: May 11, 2018

(65) Prior Publication Data
US 2020/0052789 A1   Feb. 13, 2020

(30) Foreign Application Priority Data

| Nov. 1, 2016 | (KR) | 10-2016-0144527 |
| May 26, 2017 | (KR) | 10-2017-0065035 |
| Jun. 10, 2017 | (KR) | 10-2017-0072824 |

(51) Int. Cl.
*H04B 10/67* (2013.01)
*G02B 5/22* (2006.01)
(Continued)

(52) U.S. Cl.
CPC ....... *H04B 10/07957* (2013.01); *G02B 6/293* (2013.01); *G02B 6/42* (2013.01); *H04B 10/67* (2013.01)

(58) Field of Classification Search
CPC .......... G02B 5/22; G02B 5/207; H04B 10/675
See application file for complete search history.

(56) References Cited

U.S. PATENT DOCUMENTS 5,591,966 A    1/1997   Harada et al.
6,985,281 B2*  1/2006   Wagner ............... G02B 6/4204
                                                   359/315
(Continued)

FOREIGN PATENT DOCUMENTS

| EP | 1542291 | 6/2005 |
| EP | 2866075 | 4/2015 |

(Continued)

*Primary Examiner* — Nathan M Cors
(74) *Attorney, Agent, or Firm* — Antonio Ha & U.S. Patent, LLC

(57) ABSTRACT

A wavelength tunable filter, an optical receiver and a method using the wavelength tunable filter are disclosed. According to an aspect of the present invention, an optical receiver module having a wavelength tunable filter is provided. The transmission wavelength or reflective wavelength of the wavelength tunable filter is tunable The optical receiver module includes the wavelength tunable filter, a heat generation unit, and a separation unit. The wavelength tunable filter transmits light of a preset wavelength and tunes the preset wavelength. The heat generation unit is in contact with at least a portion of the wavelength tuning filter. The separation unit has a preset thermal conductivity. The separation unit is in contact with at least another portion of the wavelength tunable filter to support the wavelength tunable filter and separate physically or thermally the wavelength tunable filter from other components of the optical receiver module except for the heat generation unit. The preset wavelength is determined based on a temperature of the heat generation unit.

4 Claims, 15 Drawing Sheets

(51) Int. Cl.
*G02B 5/20* (2006.01)
*H04B 10/079* (2013.01)
*G02B 6/293* (2006.01)
*G02B 6/42* (2006.01)

(56) References Cited

U.S. PATENT DOCUMENTS

| | | | | |
|---|---|---|---|---|
| 8,369,716 | B2* | 2/2013 | Murano | H04B 10/675 |
| | | | | 398/202 |
| 2002/0134919 | A1* | 9/2002 | Washburn | G02B 6/4201 |
| | | | | 250/214 A |
| 2007/0258722 | A1* | 11/2007 | Yu | H04B 10/673 |
| | | | | 398/212 |
| 2010/0025843 | A1 | 2/2010 | Iwaida et al. | |
| 2013/0156418 | A1 | 6/2013 | Stapleton et al. | |
| 2015/0117491 | A1* | 4/2015 | Lee | G02B 6/29322 |
| | | | | 374/141 |
| 2016/0112776 | A1 | 4/2016 | Kim | |
| 2016/0154194 | A1* | 6/2016 | Kim | G02B 6/4215 |
| | | | | 385/33 |

FOREIGN PATENT DOCUMENTS

| | | | | |
|---|---|---|---|---|
| JP | 201421466 | A | 11/2014 | |
| KR | 20110007456 | A | 1/2011 | |
| KR | 20130099695 | A | 9/2013 | |
| KR | 20150001565 | A | 1/2015 | |
| KR | 1020150001565 | * | 1/2015 | ............... G02B 5/28 |
| KR | 20150133654 | A | 11/2015 | |
| WO | 199411929 | | 5/1994 | |
| WO | 2003046630 | | 6/2003 | |
| WO | 2018084541 | A2 | 11/2018 | |
| WO | 2018084541 | A3 | 11/2018 | |

* cited by examiner (a)

(b)

VARIABLE WAVELENGTH FILTER, AND LIGHT RECEIVER AND LIGHT RECEIVING METHOD USING VARIABLE WAVELENGTH FILTER

CROSS-REFERENCES TO RELATED APPLICATION

This application claims the benefit under 35 U.S.C. § 119(a) of Korean Patent Application Nos. 10-2016-0144527, filed on Nov. 1, 2016, 10-2017-0065035 filed on May 26, 2017, and 10-2017-0072824 filed on Jun. 10, 2017, in the Korean Intellectual Property Office, the entire disclosures of which are incorporated herein by references for all purposes

TECHNICAL FIELD

The present application relates to a wavelength tunable filter having a stable and high-speed wavelength tuning speed, an optical receiver and a method for receiving an optical signal allowing for providing high-quality optical-to-electrical conversion and selective receiving of an optical signal using the wavelength tunable filter.

BACKGROUND

What is described in this section only provides background art pertaining to the present application, however it does not necessarily constitute prior art.

Recently, there have been launched numerous communication services video, such as video services on smartphones, requiring a large data transmission capacity, including.

As such, it is necessary to increase the communication capacity considerably. To this end, the wave-division multiplexing (WDM)-based communication schemes have been adopted to increase the communication capacity based on optical fibers that have already been installed.

The WDM is based on laser lights of different wavelengths to transmit such different wavelength lights simultaneously over a single optical fiber. Globally, the standard for NG-PON2 (Next Generation-Passive Optical Network version 2) has been developed, and the NG-PON2 standard defines that each downstream optical signal employs wavelengths of 4 or 8 channels from a central office end to a subscriber end.

In addition, the NG-PON2 standard defines equally-spaced wavelength spacings among channels such as 50 GHz, 100 GHz, 200 GHz, etc. In the NG-PON2 standard, one subscriber device receives an optical signal by selecting one of the WDM wavelengths. For example, one subscriber device selectively separates a certain wavelength using a fixed device for wavelength selection and provides an optical signal of the selected certain wavelength channel into an optical receiver to receive a downstream optical signal.

However, in an optical communication system in which specific optical wavelength signals are separated into specific optical fibers, conventional optical receivers that multiplex and receive optical signals to/from a certain optical fiber regardless of their wavelengths may not allow to dynamically allocate optical fibers, thus causing management issues to the optical fiber lines.

In order to serve fast-growing data traffic such as AR (Augmented Reality) or VR (Virtual Reality) based on the previously-installed optical fibers, TWDM-PON (Time Wavelength Division Multiplexing Passive Optical Network) methods have been considered for subscriber access networks globally to maximize the usage efficiency of fibers.

In the TWDM-POM system, one optical module at central office end is linked to optical receiver modules of numerous subscribers (1:32 or 1:64) corresponding to the central office. The optical receiver module of each subscriber should be able to select a specific channel for communication among channels having a wavelength spacing of 0.8 nm (e.g., 100 GHz at 1550 nm), in which such a channel tuning speed may greatly affect the operation of an optical communication.

In case a normal subscriber uses an optical communication system, since an optical signal is occasionally transmitted and received, 1 second is sufficient for a channel tuning. However, in an optical communication system used for a mobile backhaul, it may be required that the channel tuning is made within 50 msec.

Previously, in case of using a thermos-electric element, it is hard to reduce the channel tuning time between channels to less than 100 msec. That is, in case of an optical communication system having four channels, more than 300 msec may be taken for the channel tuning. Thus, the conventional optical communication system only relying on a thermos-electric element for the channel tuning may have a technical problem that the system cannot meet requirements of the specification that the channel tuning should be made within 50 msec as described above.

On the other hand, in order to solve the problems that the conventional optical receivers cannot dynamically allocate optical transmission lines, a wavelength tunable optical receiver, the reception wavelength of which can be changed, has been developed.

Wavelength tunable filters used in such wavelength tunable optical receivers are typically made by depositing amorphous silicon and SiO2 alternately on a glass substrate to only transmit a specific wavelength. Furthermore, in the NG-PON2 standard, an avalanche photo diode (APD) is defined as a photodetector that detects an optical signal of a wavelength passing through a wavelength tunable filter.

The optical wavelength transmitted through the wavelength tunable filter is changed depending on temperature thereof. Therefore, a transmission optical wavelength of the wavelength tunable filter can be adjusted by varying the temperature thereof.

In addition, since it is required that the temperature of the wavelength filter is maintained over time and its center wavelength does not vary. That is, since the performance of an optical communication system deteriorates when the central wavelength of the wavelength tunable filter varies, the wavelength of the tunable filter must be maintained stably.

The conventional wavelength tunable filter is composed of a heat generation unit and a heat drain, both of which are evenly disposed across the outer peripheral surface of the filter. Such a configuration increases the overall size of the filter so that the amount of the temperature change caused by a unit heat amount can be reduced.

In addition, due to the above-described configuration, the volume of the filter can increase the amount of heat stored in the entire volume of the filter, thus increasing a cooling time of the filter.

In addition, since the conventional wavelength tunable filter has a heater and a heat drain disposed across the entire outer circumferential surface, the thermal balance within the filter cannot be easily achieved. In the conventional wavelength tunable filter, it is not easy to have heats generated from each portion of the filter made uniform, and it is challenging to make the regions where light passes to have a uniform temperature distribution.

SUMMARY

An object of the present invention is to provide an optical receiver and an optical signal receiving method capable of changing channels by tuning an optical wavelength quickly when receiving an optical signal.

An object of the present invention is to provide an optical receiver device capable of determining a channel at operation based on an amount of power consumption in a heat generation unit, but not based on the temperature of a wavelength tunable filter.

In one embodiment, the present invention provides a wavelength tunable filter, the volume of which is reduced to cause a large temperature change only with a small change in heat amount, so that the wavelength tuning speed of the filter can be increased, and the temperature of the regions of the filter through which light passes can be uniformed.

According to an aspect of the present invention, there is provided an optical receiver module. The optical receiver module includes a wavelength tunable filter whose transmission wavelength or reflective wavelength is tunable, a heat generation unit, and a separation unit. The wavelength tunable filter is configured to transmit light of a preset wavelength and tune the preset wavelength. The heat generation unit is in contact with at least a portion of the wavelength tuning filter. The separation unit having a preset thermal conductivity, configured to be in contact with at least another portion of the wavelength tunable filter to support the wavelength tunable filter and separate physically or thermally the wavelength tunable filter from other components of the optical receiver module except for the heat generation unit. The preset wavelength is determined based on a temperature of the heat generation unit.

In one embodiment of the present invention, the optical receiver module may further include a body portion supporting components included in the optical receiver module.

In one embodiment of the present invention, the separation unit may physically or thermally separate the wavelength tunable filter and the body portion.

In one embodiment of the present invention, the body portion may be a thermo-electric element.

In one embodiment of the present invention, the body portion may maintain an internal temperature of the optical receiver module at a preset temperature.

According to an aspect of the present invention, there is provided a wavelength tunable filter. A transmission wavelength of the wavelength tunable filter is tuned based on heat. The wavelength tunable filter includes a filter and a heater. The filter is configured to transmit a preset wavelength. The heater is formed on a portion of an upper surface of the filter. Light passes through a portion on which the filter is not formed.

In one embodiment of the present invention, the upper surface of the filter may include a first section and a second section, and the heater may be only formed in the first section.

In one embodiment of the present invention, the upper surface of the filter may include a first section and a second section. The heater may be formed in the first section and the second section. The second section may include an opening, and the heater may not be formed on the opening.

In one embodiment of the present invention, the wavelength tunable filter may further include a drain. At least one portion of the drain may be thermally coupled to the filter.

According to an aspect of the present invention, there is provided an optical receiver. The optical receiver includes a photodiode, at least one capacitor, and a lens positioned above the photodiode. The at least one capacitor is positioned in vicinity of the photodiode.

In one embodiment of the present invention, the lens may be positioned above the photodiode and above the at least one capacitor.

In one embodiment of the present invention, one or more lens sub-mounts may be positioned above the at least one capacitor. A number of the lens sub-mounts may correspond to a number of the at least one capacitor. The lens may be coupled to the lens sub-mounts to be positioned above the photodiode.

According to an aspect of the present invention, there is provided an optical receiver. The optical receiver includes a photodiode, a thermo-electric element positioned not to overlap the photodiode, a lens positioned above the photodiode, and a wavelength tunable filter positioned above the lens, configured to transmit light of a preset wavelength. A portion of the wavelength tunable filter is coupled to the thermos-electric element. Another portion of the wavelength tunable filter except for the portion of the wavelength tunable filter is positioned above the lens, so that in the top view of the optical receiver, the lens is covered by the another portion of the wavelength tunable filter. The preset wavelength of the wavelength tunable filter is tuned according to a temperature of the thermos-electric element.

As described above, according to an aspect of the present invention, there is provided an advantage that a wavelength tunable filter is thermally separated through a separation unit to reduce the volume for heat generation or heat discharge made by the heat generation unit, so that a center wavelength of the wavelength tunable filter can be tuned quickly.

According to an aspect of the present invention, there is provided an advantage that the center wavelength of the wavelength tunable filter can be tuned quickly, regardless of the external temperature, by using a body portion as a thermoelectric element.

According to an aspect of the present invention, there is provided an advantage that the uniformity of the temperature can be enhanced by incorporating a heat generation unit used for varying the center wavelength thereof.

According to an aspect of the present invention, there is provided an advantage that a channel at operation can be determined only based on an amount of power consumption of the heat generation unit, so that a separate physical element for determining the channel is not required.

According to an aspect of the present invention, there is provided an advantage that by having an optical receiver with an optimal structure, an electrical performance thereof can be improved, and packaging can be made with ease.

According to an aspect of the present invention, there is provided an advantage that the filter can be coupled without a separate mount, so that fabrication can be easier to lower the cost

BRIEF DESCRIPTION OF THE DRAWINGS

FIG. 19 depicts a side view of an optical receiver device according to the tenth embodiment of the present invention.

DETAILED DESCRIPTION

Various modifications and embodiments are possible with respect to the present invention. Particular embodiments are illustrated in drawings and described in detail.

However, this is not intended to restrict the present invention into a particular form of embodiments, it should be understood that all modifications, equivalents or substitutes included in the spirit and scope of the present invention are included. The same reference numbers are used to like elements.

The terms including the ordinal numbers such as first, second, A, B, etc. can be used in describing various elements, but the above elements shall not be restricted to the above terms. These terms are only used to distinguish one element from the other.

For example, a first element could be termed a second element, and a second element could be termed a first element, without departing from the scope of the present invention. Herein, the term "and/or" includes any and all combinations of one or more referents.

It will be understood that when an element is referred to as being "connected" or "coupled" to another element, it can be directly connected or coupled to the other element or intervening elements may be present. The terms used herein are merely used to describe particular embodiments, and are not intended to limit the present invention. The use of the singular form in the present document should not preclude the presence of more than one referent. In other words, elements of the invention referred to in the singular may number one or more, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein are to be interpreted as is customary in the art to which this invention belongs. It will be further understood that terms in common usage should also be interpreted as is customary in the relevant art and not in an idealized or overly formal sense unless expressly so defined herein.

Figure 1:
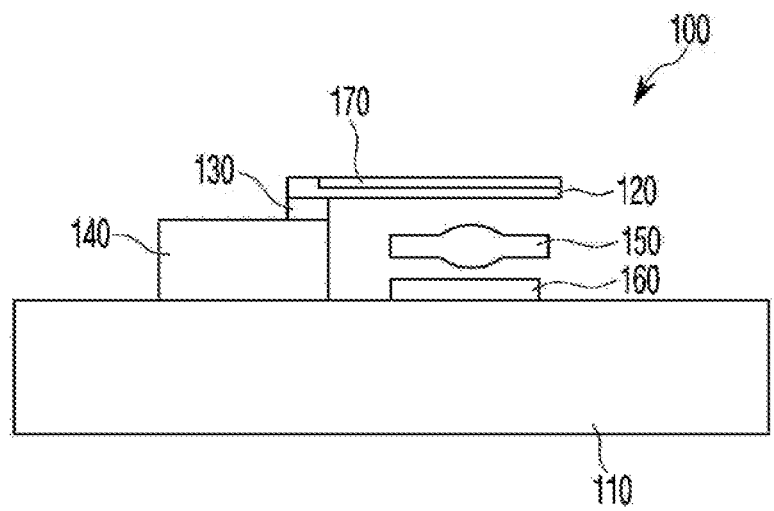
FIG. 1 depicts a section view of an optical receiver device according to the first embodiment of the present invention.

FIG. 1 is a section view of an optical module according to the first embodiment of the present invention.

Referring to FIG. 1, an optical receiver module 100 according to the first embodiment of the present invention includes a stem base 110, a wavelength tunable filter 120, a separation unit 130, a body portion 140, a lens 150, a photodiode 160, a heat generation unit 170, etc.

The stem base 110 is configured to be electrically grounded. The stem base 110 further includes terminal(s) which are separated from the ground. Electrical powers, control signals or data can be exchanged through the terminals.

The stem base 110 provides electrical powers or control signals to each part or element of the optical receiver module 100 using the terminals and transmits data to outside systems.

Upon receiving light, the wavelength tunable filter 120 only passes light of a preset wavelength and filters out lights of other wavelengths than the preset wavelength.

In the wavelength tunable filter 120, the transmission optical wavelength of the wavelength tunable filter 120 varies depending on temperature. Thus, a controller (not shown) of the optical receiver module 100 controls the temperature of the wavelength tunable filter 120 to only pass the preset optical wavelength.

In addition, by determining the temperature of the wavelength tunable filter 120, the controller can monitor as to which optical wavelength is currently passing through the wavelength tunable filter 120.

The wavelength tunable filter 120 may include a silicon filter of a thin-film type. Typically, silicon has a temperature characteristic of 0.08 nm/° C. For example, as the temperature increases by 1° C., a center wavelength of the wavelength tunable filter 120 moves to a longer wavelength by 0.08 nm (e.g., 10 GHz at 1550 nm). If the temperature of the wavelength tunable filter 120 is set to a certain level by the heat generation unit 170, the center wavelength of the wavelength tunable filter 120 can be set to a desired wavelength.

The separation unit 130 is coupled to the wavelength tunable filter 120 and the body portion 140, so it thermally separates the wavelength tunable filter 120 and other elements (particularly, body portion 140).

Here, the term "thermally separate (objects)" does not necessarily mean to thermally separate the objects completely, instead, it may be understood to mean a condition where a temperature difference between both ends of the separation unit 130 is large enough to implement the technical ideas of the present invention.

For example, in the thermal characteristic, when components (or elements) are spatially separated by air, it can be understood that the components are thermally separated. As described above, since the separation unit 130 cannot completely block a fine heat exchange, the minute heat exchange may occur through the separation unit 130.

Since the wavelength tunable filter 120 is separated from other components by the separation unit 130, a volume of a portion requiring heat dissipation is reduced to that of the wavelength tunable filter 120.

In the presence of the separation unit 130 is present, the most of the heat generated from the heat generation unit 170 only affects the temperature of the wavelength tunable filter 120. However, in the absence of the separation unit 130, the heat generated from the heat generation unit 170 affects the temperature of all the components thermally coupled to the wavelength tunable filter 120. That is, the heat generated from the heat generation unit 170 can be transferred to the body portion 140, the stem base 110, external packings, etc. Accordingly, the heat generation unit 170 cannot make a temperature change of the wavelength tunable filter 120 accurately or promptly.

In addition, in the absence of the separation unit 130, it will be very difficult to accurately make the temperature change of the wavelength tunable filter 120 only based on the heat generation unit 170 due to the external temperature variation.

The separation unit 130 thermally separates the wavelength tunable filter 120 from other components, so an accurate and prompt temperature change can be made on the wavelength tunable filter 120.

One end of the separation unit 130 is coupled in contact with one end of the wavelength tunable filter 120, and another end of the separation unit 130 is coupled in contact with the body portion 140. For example, as depicted in FIG. 1, the upper surface of the separation unit 130 is coupled to one surface of the wavelength tunable filter 120, and the lower surface of the separation unit 130 is coupled to the body portion 140. The portion to which the separation unit 130 is coupled can be a single surface or a plurality of surfaces.

However, the surface(s) where the separation unit 130 is coupled to the wavelength tunable filter 120 shall be different than the surface(s) where the separation unit 130 is coupled to the body portion 140.

The separation unit 130 is made of a material(s) having a low thermal conductivity with a high thermal resistance. The separation unit 130 is made of a material having a thermal conductivity of less than 20 W/cm·° C., preferably less than 5 W/cm·° C. The separation unit 130 may be made of a material having a low thermal conductivity such as Al2O3, glass, quartz, etc., or particularly may be made of glass.

However, the aforementioned materials are only examples of materials having low thermal conductivities, and the separation unit 130 is not necessarily composed of at least one of the aforementioned materials.

However, since such a material with zero thermal conductivity cannot exist, the separation unit 130 drains a portion of the heat generated by the heat generation unit 170 into the body portion 140.

The body portion 140 is disposed between the stem base 110 and the separation unit 130, so that each component inside the optical receiver module 100 can be arranged and fixed at a corresponding position. The body portion 140 includes at least one of metal, silicon, and aluminum nitride. However, the body portion 140 may be made of a material having a higher thermal conductivity than the separation unit 130.

The lens 150 is disposed between the photodiode 160 and the wavelength tunable filter 120 to condense the light transmitted through the wavelength tunable filter 120 for allowing the photodiode 160 to receive the condensed light.

Since the light transmitted through the wavelength tunable filter 120 is not condensed to one spot but is scattered and incident to the optical receiver module 100, an intensity of the light transmitted through the wavelength tunable filter 120 may be lower than a threshold at which the photodiode 160 can detect light.

The lens 150 condenses the light transmitted through the wavelength tunable filter 120 for allowing the photodiode 160 to detect the received light. In addition, if the optical receiver module 100 is implemented with a TO-CAN type structure, a high spatial efficiency can be achieved since the lens 150 is disposed between the photodiode 160 and the wavelength tunable filter 120.

The photodiode 160 receives the light that has been transmitted through the wavelength tunable filter 120 and condensed by the lens 150. The photodiode 160 receives an optical signal and converts the same into an electrical signal, thereby transmitting data with respect to whether the optical signal is received, intensity of a received optical signal, etc. into a controller (via the stem base 110).

The heat generation unit 170 contacts one end of a portion of the wavelength tunable filter 120 and includes a resistance component to generate heat when electrical power is supplied. Thus, the heat generation unit 170 makes a temperature change of the wavelength tunable filter 120 based on the heat generated by the heat generation unit 170. The heat generation unit 170 may include a resistance component, in particular, a chip resistance or a chromium resistance.

The heat generation unit 170 generates heat through the resistance component based on supplied electrical power. The heat generated by the heat generation unit 170 is proportional to an amount of the supplied electrical power. Therefore, although the temperature of the wavelength tunable filter 120 is not directly measured, the temperature of the wavelength tunable filter 120 can be determined based on the amount of the electrical power supplied to the heat generation unit 170 and information regarding the transmission optical wavelength of the wavelength tunable filter 120.

The controller can control the temperature of the wavelength tunable filter 120 based on database regarding relationships among the amount of the electrical power supplied to the heat generation unit 170, the information of the transmission optical wavelength of the wavelength tunable filter 120, and the temperature of the wavelength tunable filter 120.

Figure 2:
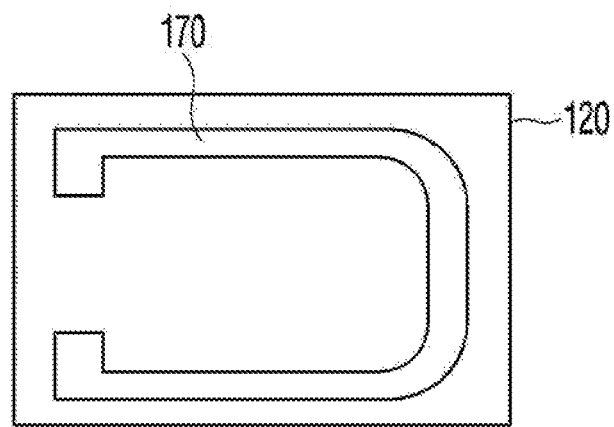
FIG. 2 depicts a plan view of a wavelength tunable filter according to the first embodiment of the present invention.

The detailed structure of the heat generation unit 170 is depicted in FIG. 2.

FIG. 2 depicts a plan view of a wavelength tunable filter according to the first embodiment of the present invention.

The heat generation unit 170 is provided on the upper surface of the wavelength tunable filter 120 along with a circumferential direction thereof. The heat generation unit 170 further includes a pad (not shown) to which electrical power is connected.

Based on the above structure, the heat generation unit 170 can transfer heat to the front of the wavelength tunable filter 120 promptly. The heat generation unit 170 is coupled to the upper surface and/or the lower surface of the wavelength tunable filter 120 for the heat transfer. In case the heat generation unit 170 is coupled to the lower surface of the wavelength tunable filter 120, the heat can be transferred more uniformly in a thickness direction of the wavelength tunable filter 120.

In order to have the heat generation unit 170 to be coupled to the wavelength tunable filter 120, the resistance component of the heat generation unit 170 may be disposed on the wavelength tunable filter 120, or may be coated on the upper surface and/or the lower surface of the wavelength tunable filter 120 using a metal deposition method.

Alternatively, the heat generation unit 170 may be formed to be located inside the wavelength tunable filter 120 through the process when the wavelength tunable filter 120 is being manufactured. In order to move the center wavelength of the wavelength tunable filter 120 in a longer wavelength, the controller makes a control to increase the temperature of the wavelength tunable filter 120 by supplying electrical power to the heat generation unit 170 for heat generation.

On the other hand, in order to move the central wavelength of the wavelength tunable filter 120 in a shorter wavelength, the controller make a control to cut off (or stop) supplying power to the heat generation unit 170.

Although the wavelength tunable filter 120 is thermally separated from other components through the separation unit 130, a small amount of heat exchange may occur. Since the volume of the wavelength tunable filter 120 is very small, the heat energy contained in the wavelength tunable filter is also small. As such, despite the slow heat exchange speed through the separation unit 130, the temperature of the wavelength tunable filter 120 can be changed so quickly due to the small amount of heat exchange through the separation unit 130.

Therefore, the optical receiver module 100 according to an embodiment of the present invention can change the temperature of a wavelength tunable filter much faster than conventional methods of changing the temperature of a wavelength tunable filter based on a thermoelectric element such as TEC.

A control method according to the first embodiment for controlling the temperature of the wavelength tunable filter 120 is described as follows.

The separation unit 130 generates a temperature difference Td between a temperature T1 of the body portion 140 and a temperature T2 of the wavelength tunable filter 120 affected by the heat generation unit 170. The center wavelength of the wavelength tunable filter 120 is determined by the temperature of the heat generation unit 170, and the thus, the temperature difference Td varies depending on channel.

As described above, in order to move a channel corresponding to the central wavelength of the wavelength tunable filter to a longer wavelength direction, the temperature of the wavelength tunable filter 120 needs to be increased. Therefore, the controller makes a control to supply power to the heat generation unit 170 in order to increase the temperature of the wavelength tunable filter 120.

In contrast, in order to move the channel to the shorter wavelength direction, the controller makes a control to cut off the power supplied to the heat generation unit 170 in order to reduce the temperature of the wavelength tunable filter 120.

As the temperature T1 changes, the temperature T2 may also slightly changes. In this case, it is preferable to control it based on a wavelength fixing method, which will be described later T2, where T2 can be reduced in a natural manner.

In the optical receiver 100 according to an embodiment of the present invention, the separation unit 130 is configured to thermally separate the wavelength tunable filter 120 from other components. However, this thermal separation is not perfectly made, but a small amount of heat exchange may occur.

On the other hand, since the volume of the wavelength tunable filter 120 that needs to be heated and dissipated is relatively small, the temperature of the wavelength tunable filter 120 can be decreased quickly.

In addition, Td should preferably be more than at least 60 to 70° C. or more in order to experimentally have a fast cooling speed. However, the preferable Td can be changed according to the temperature characteristics of each component and the external environment.

Figure 3:
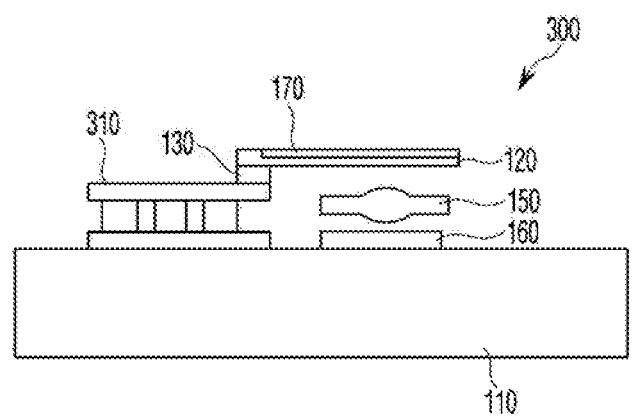
FIG. 3 depicts a section view of an optical receiver device according to the second embodiment of the present invention.

FIG. 3 depicts a section view of an optical receiver module according to the second embodiment of the present invention.

Referring to FIG. 3, the optical receiver module 300 according to the second embodiment of the present invention includes the same configuration as the optical receiver module 100 except for the body portion 310.

The body portion 310 includes a portion or the whole part of the thermo-electric element. As described above, since the body portion 140 according to the first embodiment of the present invention is partially affected by an external temperature, a precise control on the heat generation unit 170 is required for stably changing the temperature of the wavelength tunable filter 120.

On the other hand, the body portion 310 including the thermoelectric element can maintain at a preset temperature without being affected by the temperature of the stem base 110 and the external temperature. The body portion 310 includes a temperature sensor, measures the temperature of the body portion 310 using the temperature sensor, and transmits the measured temperature information to the controller. The controller controls the thermoelectric element such that the temperature of the body portion 310 is maintained at a preset temperature.

In addition, since the separation unit 130 has a low thermal conductivity, a heat transfer can be made between the wavelength tunable filter 120 and the body portion 310 although it is small. The controller may control the thermoelectric element based on the temperature of the body portion 310 and the heat transferred through the separation unit 130.

The temperature of the body portion 310 including the thermoelectric element is changed more slowly than the temperature of the wavelength tunable filter 120 is changed by the heat generation unit 170. This is because the volume (of the body portion 310) thermally changed by the thermoelectric element is much larger than the volume of the wavelength tunable filter 120. Therefore, preferably, the center wavelength of the wavelength tunable filter 120 (e.g., generation of the temperature change) is changed by the heat generation unit 270.

A control method according to the second embodiment for controlling the temperature of the wavelength tunable filter 120 is described as follows.

As described above, in order for the central wavelength of the wavelength tunable filter 120 to move to a longer wavelength direction, the temperature of the wavelength tunable filter 120 should be increased, and conversely, the temperature of the wavelength tunable filter 120 should be decreased to move to a shorter wavelength direction.

For example, in case it is assumed that there are 100 GHz spaced four channels, and the shortest wavelength channel is referred to as a "channel 1" and the longest wavelength channel is referred to as a "channel 4", the controller can increase the temperature of the wavelength tunable filter 120 if the central wavelength of the wavelength tunable filter 120 needs to move the center wavelength of the wavelength tunable filter from channel 1 to channel 4.

Since the volume of the wavelength tunable filter 120 is very small, the temperature of the wavelength tunable filter 120 rapidly rises. In addition, since the amount of generated heat is proportional to the amount of power supplied to the wavelength tunable filter 120, the amount of the generated heat can also be estimated.

On the other hand, in order to move the center wavelength of the wavelength tunable filter 120 from channel 4 to channel 1, the controller can further increase the temperature of the wavelength tunable filter 120 to utilize a next passband of a free spectral range of the wavelength tunable filter 120.

However, in such a case, since the heat generation unit 170 should continuously generate the heat to the wavelength tunable filter 120, an issue may occur on associated components. Therefore, it is preferable that the temperature of the wavelength tunable filter 120 is reduced to move the center wavelength of the wavelength tunable filter 120 from channel 4 to channel 1.

As described above, since the optical receiver module 100 includes the separation unit 130 and the wavelength tunable filter 120 is separated from the body 310 by the separation unit 130, the heat of the wavelength tunable filter 120 can be discharged promptly.

The separation unit 130 generates a difference Td between the temperature T1 of the body portion 310 including the thermoelectric element and the temperature T2 of the wavelength tunable filter 120 affected by the heat generation unit 170. The center wavelength of the wavelength tunable filter 120 is determined depending on the temperature of the heat generation unit 270, and the temperature difference Td varies over channel.

Here, the temperature control method varies based on how Td is controlled. A first temperature control method is as follows. In order to move a channel to the longer wavelength direction, the temperature of the wavelength tunable filter 120 should be increased, and thus, the controller increases the temperature of the wavelength tunable filter 120 by increasing the temperature of the heat generation unit 270 and holds on the temperature of the body portion 310. However, T1 is maintained at a preset temperature by the thermoelectric element even if it is affected by the external temperature, etc.

On the contrary, in order to move the channel to a shorter wavelength direction, the temperature of the wavelength tunable filter 120 should be decreased, and thus, the controller holds on T1 and lowers T2.

A second temperature control method is as follows. The mechanism for moving the channel to the longer wavelength direction is the same as the first temperature control method.

However, in moving the channel to the shorter wavelength direction based on the second temperature control method, in order to rapidly lower the temperature of the wavelength tunable filter 120, the controller simultaneously reduces both T1 and T2 and makes a fine tuning on T2 while adjusting T1 to a preset temperature after a predetermined time, so that the channel is precisely selected. Here, for the fine temperature control, a wavelength fixing method is applied, and this method can be applied to all the embodiments described previously.

The principle of the wavelength fixing method is as follows. When a wavelength of the light corresponds to the center wavelength of the filter, the intensity of the received light is maximized. That is, the maximum current is generated in the photodiode. Thus, in the wavelength fixing method, the temperature of the wavelength tunable filter 120 is finely adjusted to have the maximum current generated from the photodiode.

Typically, the temperature is usually adjusted within a range of ±0.2° C. T2 is finely adjusted because the temperature response characteristic of the wavelength tunable filter 120 is faster than the body portion 310.

Further, in order to have a faster cooling speed, Td is preferably more than at least 60 to 70 degrees. However, the preferable temperature of Td can be changed in consideration of the temperature characteristics of associated components and external environment.

A configuration of the wavelength tunable filter and a method for determining channels are described as follows. The wavelength tunable filter to be described hereinafter allows for determining on which channel number the received signal corresponds to.

The wavelength tunable filter can be implemented using a thin film silicon filter having a Fabry-Perot structure due to ease of production and bandwidth characteristics of this filter. The thin film silicon filter having the Fabry-Perot structure has a free spectral range (FSR) as a bandwidth characteristic. The thin film silicon filter has a passband repeating every predetermined period, so called FSR.

Figure 4:
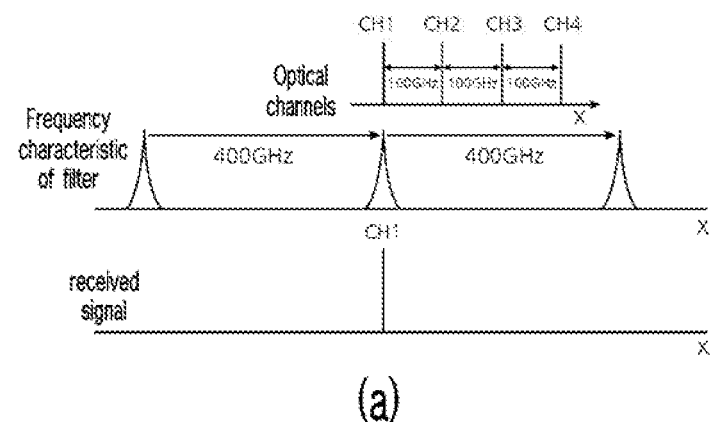
FIG. 4 depicts frequency characteristics of conventional wavelength tunable filter and a wavelength tunable filter according to an embodiment of the present invention.
Figure 4:
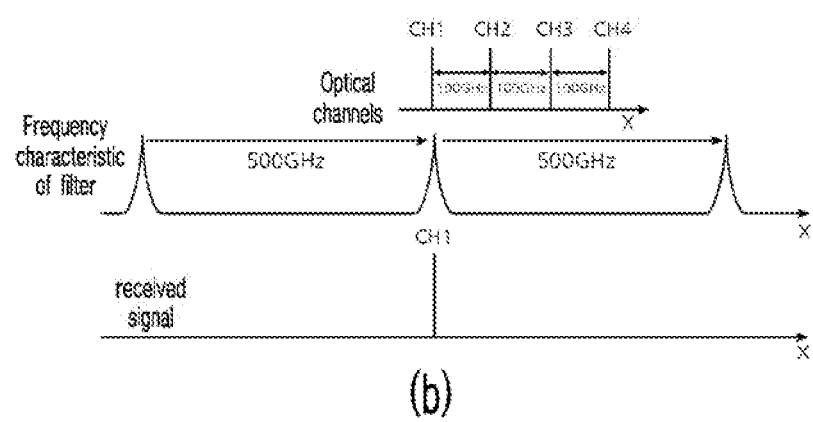

FIG. 4(a) depicts a frequency characteristic of a conventional wavelength tunable filter.

In a conventional WDM system, a conventional wavelength tunable filter is provided to have an FSR substantially equal to the bandwidth of the entire channels because the passband wavelength of the filter can be tuned over various frequency ranges. For example, if the WDM system has 100 GHz spaced four channels, generally, the wavelength tunable filter is adapted to have an FSR of 400 GHz substantially equal to the bandwidth of the entire channels.

In this case, if the center wavelength of the wavelength tunable filter is set to a first FSR band, in order to move the center wavelength of the wavelength tunable filter from channel 1 to channel 4, it might be preferable that the center wavelength of the wavelength tunable filter is moved to a second FSR band instead of the temperature of the wavelength tunable filter is increased from channel 1 to channel 4. This is because a change between FSR bands is faster than a change between channels.

On the other hand, to change the center wavelength of the wavelength tunable filter from channel 4 to channel 3, the controller can change the center wavelength of the wavelength tunable filter to the second FSR band and then rechanges the channel, or change the channel in the first FSR band. This is because various conditions can be established.

This can be made because the wavelength tunable filter is directly connected to a thermoelectric element with a temperature sensor without any separation unit. By monitoring the temperature information of the wavelength tunable filter using the temperature sensor of the thermoelectric element, the controller would able to determine exactly the position of the center wavelength of the wavelength tunable filter and which channel number the received signal corresponds to.

However, as in an embodiment of the present invention, when the temperature of the wavelength tunable filter is directly changed by a heating element, accurate temperature measurement of the wavelength tunable filter itself is not easy. This is because it is difficult to attach the temperature sensor to the wavelength tunable filter due to issues associated with specifications or positions.

In case the tunable filter is implemented using a thin film silicon filter with the Fabry-Perot structure, the wavelength tunable filter has a free spectral width (FSR) and thus, it is difficult for the controller to determine on which channel number of which FSR band the present channel corresponds to.

Therefore, the wavelength tunable filter according to an exemplary embodiment of the present invention is configured to have an FSR different than the bandwidth of the entire channels, as shown in FIG. 4(b).

FIG. 4(b) depicts a frequency characteristic of a wavelength tunable filter according to an embodiment of the present invention.

For example, in case the WDM system has 100 GHz spaced four channels, the first channel and the last channel are apart by 300 GHz. However, in order to include only one channel within the FSR of the wavelength tunable filter and minimize the crosstalk between neighboring channels, it is preferable that the FSR is set to at least 400 GHz. For example, the FSR can be 450 GHz, 500 GHz, etc.

The FSR of the wavelength tunable filter can be made to be less than 400 GHz. In this case, however during the wavelength tunable filter being tuned, the power from the other channels may come into the FSR, and the performance may deteriorate due to the crosstalk between the channels.

As described above, the temperature of the heat generation unit is proportional to the amount of supplied electrical power. Therefore, based on determining the amount of electrical power supplied to the heat generation unit, the temperature of the heat generation unit can be determined.

Also, it is noted that the center wavelength of the wavelength tunable filter varies over temperature at a rate of 100 GHz/10° C. (in the case of a silicon-type filter) which is constant. For example, assuming that if the WDM system has 100 GHz spaced four channels and the FSR of the wavelength tunable filter is 400 GHz, the temperature (of the wavelength tunable filter) at which channel 1 passes through the first FSR band is set to 40° C., in this case, when the temperature of the wavelength tunable filter rises to 80° C., channel 1 passes through again a third FSR band which is positioned in a shorter wavelength band from the first FSR band. That is, the channels are equally spaced according to the temperature variation.

Further, since the temperature change is substantially proportional to the amount of electrical power supplied to the heat generation unit, the amount of the power supplied to the heat generation unit may also be changed by equal amounts when changing the channels.

On the other hand, if the FSR is different from the bandwidth of the entire channels, the amount of the electrical power supplied to the heat generation unit may not be changed by equal amounts at a certain point. That is, an amount of power consumption for a change from channel 3 to channel 4 (a case where channel is changed by increasing the temperature) is different from an amount of power consumption for a channel change from channel 4 to channel 1 (a case where channel is changed by changing an FSR). Therefore, if the amount of power consumption for a channel change is different from a predetermined amount of power, it will be determined that the channel being changed corresponds to channel 1. Therefore, based on the above-mentioned features, the controller can determine as to which channel number the current position corresponds to. Detailed description thereof will be made with reference to FIG. 5.

Figure 5:
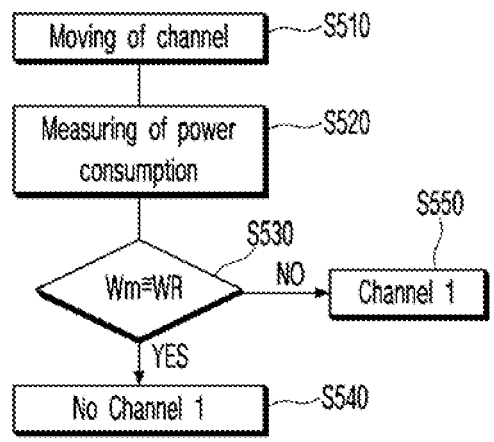
FIG. 5 depicts a flow chart illustrating a method for determining channels using a wavelength tunable filter according to an embodiment of the present invention.

FIG. 5 depicts a flow chart illustrating a method for determining channels using a wavelength tunable filter according to an embodiment of the present invention.

When the channel is changed (S510), the controller measures the amount of power consumption for this channel change (S520). The controller determines whether a difference between the amount of power consumption and a preset amount of power is within a predetermined error range (S530).

If the difference between the amount of power consumption and the preset amount of power is within the predetermined error range, the controller determines that the changed channel (or channel at change) is not channel 1 (S540). Thus, when the channel is changed from channel 1 to channel 2, from channel 2 to channel 3, and channel 3 to channel 4, the respective amounts of power consumed for such channel changes are substantially the same one as another within a certain error range.

If the difference between the amount of power consumption and the preset amount of power is out of the predetermined error range, the controller determines that the changed channel is channel 1 (S550).

For example, a difference between the amount power consumption when the channel is changed from channel 4 to channel 1 and the preset amount of power 1 may be more than the predetermined error.

Thus, by measuring the amount of power consumption for each channel change, the controller may determine as to which channel number the currently changed channel is. The above description can be applied to a case where the channel is moved to a longer wavelength direction.

If a difference between the amount of power consumption when the channel is changed to a shorter wavelength direction and the preset amount of power is more than the predetermined error, the controller may determine that the channel is changed from channel 4.

Figure 6:
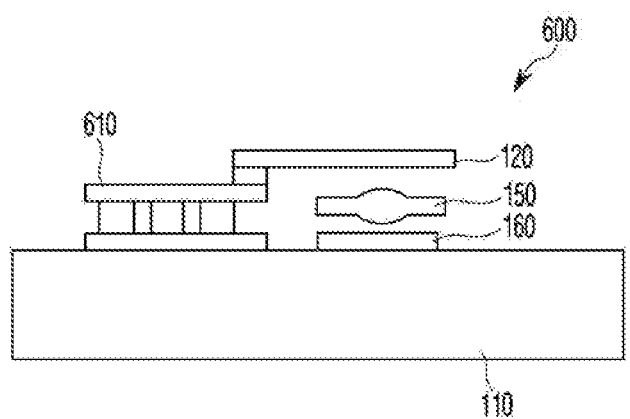
FIG. 6 depicts a section view of an optical receiver device according to the third embodiment of the present invention.
Figure 7:
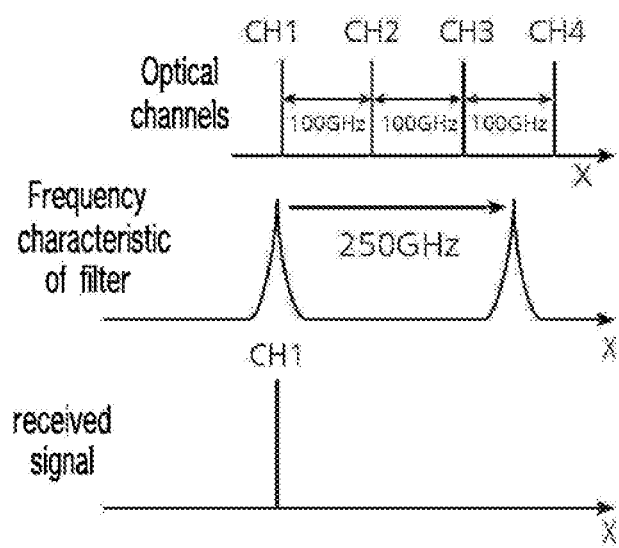
FIG. 7 depicts a graph illustrating a frequency characteristic of a wavelength tunable filter according to the third embodiment of the present invention.

FIG. 6 depicts a section view of an optical receiver module according to the third embodiment of the present invention.

Referring to FIG. 6, the optical receiver module 600 according to the third embodiment of the present invention has the same configuration as the optical receiver module 100 except for the body portion 610. The optical receiver module 600 can minimize a wavelength tuning range of the wavelength tunable filter.

As described above, when the temperature of the wavelength tunable filter rises, the center wavelength of the wavelength tunable filter 120 moves to the longer wavelength direction, and when the temperature is lowered, the center wavelength thereof moves to the shorter wavelength direction.

Further, the wavelength tunable filter 120 can be implemented using a thin film silicon filter with a Fabry-Perot structure. Typically, the wavelength tunable filter 120 has an FSR substantially equal to the bandwidth of the entire channels.

In this case, a general method for operating the tunable wavelength filter is to change the center wavelength thereof in an FSR, and thus a control algorithm of the method becomes simpler. However, if only one FSR is used, a temperature tuning range becomes larger.

For example, if the WDM system has 100 GHz spaced four channels, and the channel is changed from channel 1 to channel 4, the temperature of the wavelength tunable filter may need to rise by 30° C. Conversely, when the channel is changed from channel 4 to channel 1, the temperature of the tunable filter may need to be lowered by 30° C.

However, a thermo-electric element which can be inserted into a TO-CAN has a thermal variation rate of about 13° C./100 msec, thus taking a relatively long time for channel change.

Therefore, the wavelength tunable filter 120 according to an embodiment of the present invention is configured to have an FSR based on the following equation.

$$FSR=(0.5*N*S)+(0.5*S) \text{ (GHz)} \qquad \text{Equation 1,}$$

where N represents the number of total channels, and S represents a channel spacing in GHz.

For example, if the WDM system has 100 GHz spaced four channels, then the FSR can be configured to be 250 GHz. Further, when the channel is changed as below in the optical receiver module, the wavelength tuning range of the wavelength tunable filter can be minimized.

TABLE 1

| CH1 -> CH2 | +100 GHz |
| CH1 -> CH3 | −50 GHz |
| CH1 -> CH4 | +50 GHz |
| CH2 -> CH3 | −150 GHz |

If the channel is changed in an opposite wavelength direction, the sign of the frequency shift is reversed. When the FSR is configured as shown in the above, the maximum wavelength tuning range required for the channel change can be reduced by half.

In Equation 1, the half the channel spacing is added to the right side by taking into account the bandwidth characteristic of the wavelength tunable filter.

The Fabry-Perot etalon silicon filter used in the WDM system having 100 GHz channel spacing has a bandwidth 20 GHz to 30 GHz at −3 dB and a bandwidth of about 130 GHz at −20 dB when the transmittance of the wavelength tunable filter is set to 0 dB at the center wavelength.

Therefore, if the FSR is not configured to be the half the channel bandwidth, the other channel(s) will appear in a second FSR band. Thus, it is preferable that the FSR is set to the half the channel spacing.

In the above embodiment, although a difference between a passband of the second FSR and each channel is set to about 20 dB, the structure of the Fabry-Perot etalon silicon filter may be partially modified to improve the system performance.

Figure 8:
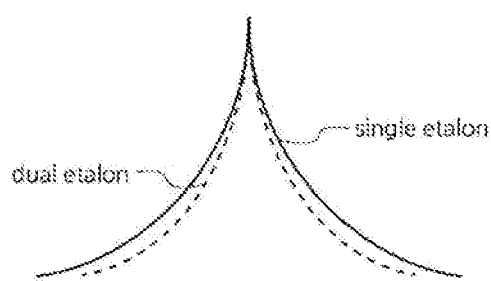
FIG. 8 depicts graphs illustrating frequency characteristics of a single-etalon based wavelength tunable filter and a dual-etalon based wavelength tunable filter according to an embodiment of the present invention.

FIG. 8 depicts graphs illustrating frequency characteristics of a single-etalon based wavelength tunable filter and a dual-etalon based wavelength tunable filter according to an embodiment of the present invention.

Typically, the Fabry-Perot etalon silicon filter is fabricated with a single etalon structure. However, if a Fabry-Perot etalon silicon filter is fabricated with dual etalon structure, −20 dB bandwidth of the wavelength tunable filter can be lowered to about 90 GHz, thereby reducing signals entering from the other channels than the conventional single etalon structure.

Even if the wavelength tunable filter is fabricated with a single etalon structure, −20 dB bandwidth of the wavelength tunable filter may be reduced, but in this case, −3 dB bandwidth thereof may also be reduced. Generally, the wavelength of light emitted from a WDM transmitter may not be completely fixed. Instead, the wavelength of the emitted light may be slightly changed within 20 GHz (at 100 GHz channel spacing), so that −3 dB bandwidth of the wavelength tunable filter is configured to cover 20 GHz.

Described hereinafter is a wavelength tuning method for maximizing a wavelength tuning speed of a temperature control-based wavelength tunable filter.

Figure 9:
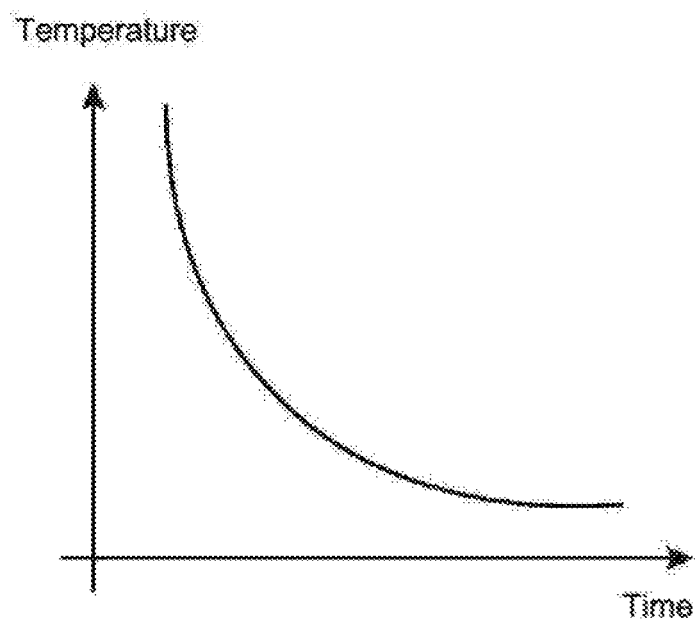
FIG. 9 depicts a graph illustrating variation of temperature over time when a thermo-electric element or a heat generation part according to an embodiment of the present invention.

FIG. 9 depicts a graph illustrating variation of temperature over time when a thermo-electric element or a heat generation unit according to an embodiment of the present invention.

Referring to FIG. 9, the temperature (when heat is discharged) varies over time in an inverse proportional manner. That is, it takes a shorter time to reduce 10° C. at a higher temperature than to reduce 10 degrees at a lower temperature. Thus, if the wavelength tunable is set to have a high temperature, the wavelength can be controlled at a high speed.

Figure 10:
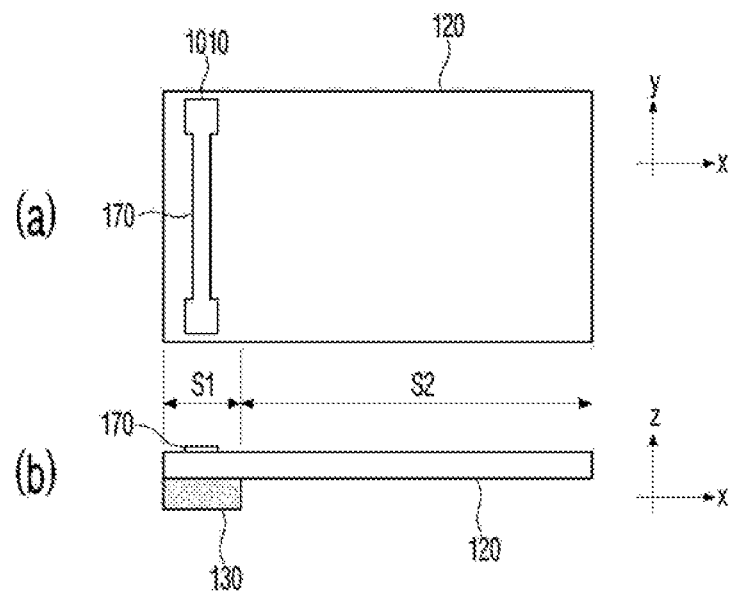
FIG. 10 depicts a plan view and section view of a wavelength tunable filter including a heater according to the fifth embodiment of the present invention.

FIG. 10 depicts a plan view and section view of a wavelength tunable filter including a heat generation unit according to the fifth embodiment of the present invention.

Generally, an optical filter transmits a predetermined first wavelength band and reflects a predetermined second wavelength band except for the first wavelength band.

The wavelength tunable filter 120 may vary the center of the first wavelength band to select the light to be transmitted depending on wavelength. When heat is applied to an optical filter, the refractive index of the wavelength tunable filter is changed to change the transmission characteristic thereof, so that the change of the transmission characteristic changes an optical transmission wavelength of the filter.

In the fifth embodiment, the heat generation unit 170 including a pad 1010 through which current is provided may be thermally coupled to the upper surface of the wavelength tunable filter 120.

The pad 1010 receives electrical power from the external and supplies the power to the heat generation unit 170. When the wavelength tunable filter 120 is divided into two sections S1 and S2, the heat generation unit 170 thermally coupled to the wavelength tunable filter 120 may be located only in the first section S1. The second section S2 is a region through which the light is transmitted or reflected for transmission or reception.

The energy transfer generated by a temperature difference refers to a heat transfer. The heat generated in the heat generation unit 170 tends to be transferred from a portion at a higher temperature to a portion at a lower temperature.

Since the wavelength tunable filter 120 is thermally coupled to the separation unit 130, when the heat generation unit 170 formed only in the first section S1 generates heat first, the temperature of the first section S1 rises and the temperature of the second section S2 maintains without being changed, thus resulting in a temperature difference between the two sections.

Due to this temperature difference, the heat generated in the heat generation unit 170 is transferred to the second section S2 with a lower temperature to increase the temperature of the second section S2. The temperature rise in the first section S1 results in a large temperature difference with respect to the separation unit 130, thereby enhancing the heat transfer to the separation unit 130.

At this time, in case the separation unit 130 is attached to a certain element at a predetermined temperature, as the temperature of the first section continuously increases, the temperature difference between the first section S1 and the separation unit 130 also continuously increases, so that the heat transfer between the first section S1 and the separation unit 130 continuously increases.

When the heat transfer between the first section S1 and the separation unit 130 is made such that the temperature of the separation unit 130 reaches to the temperature of the first section S1, the temperature rise of the first section S1 is stopped, and thus, a thermal balance is made between the first section S1 while maintaining a certain temperature difference therebetween.

In addition, when the temperature of the first section S1 continuously increases, the temperature difference between the temperature of the first section S1 and the second section S2 continues to be maintained, so that a heat transfer between the first section S1 and the second section S2 may also occur.

Due to such a heat transfer, the temperature of the second section S2 may also continuously increase. When the temperature of the first section S1 increases to the level corresponding to the amount of heat discharged through the separation unit 130, the temperature of the first section S1 is maintained at the corresponding temperature.

When the temperature of the first section S1 is maintained at a certain level, the heat of the first section S1 is transferred to the second section S2 to increase the temperature of the second section S2 since there is no path in the second path S2 for the heat to be discharged.

When the temperature of the second section S2 reaches the same level as the temperature of the first section S1, the heat transfer from the first section S1 to the second section is not made any more. This is because the temperature of the second section S2 must be equal to the temperature of the first section S1 unless heat is generated and drained in the second section S2.

If heat is generated, but the heat is not drained in the second section S2, the temperature of the second section S2 rises to be higher than the temperature of the first section S1, thus resulting in a continuous heat transfer from the second section S2 to the first section S1, which means that there is a temperature gradient between the sections S1 and S2.

Also, if no heat is generated and no heat is drained in the second section S2, the temperature of the first section S1 rises to be higher than the second section S2, thus resulting in a continuous heat transfer from the first section S1 to the second section S2, which means that there is a temperature gradient between the sections S1 and S2. However, if heat is generated and the heat is drained in the second section S2, it is difficult for the first and second sections S1 and S2 to be completely balanced in temperature, so that there may be an unwanted temperature gradient between the first section S1 and the second section S2.

In the present invention, since no heat is generated and no heat is drained in the second section S2, the temperature of the first section S1 is stable, which enables the heat transfer from the first section S1 to the second section S2 until the temperature of the second section S2 reaches the temperature of the first section S1.

Next, when the temperature of the second section S2 reaches the temperature of the first section S1, the heat transfer from the first section S1 to the second section S2 is automatically stopped, so that the temperatures of the first section S1 and the second section S2 are maintained at the same level.

If the separation unit 130 is positioned below both the first section S1 and the second section S2, the temperature of the first section S1 may always become higher than the temperature of the second section S2 due to the heat generated in the heat generation unit 170 of the first section S1, thus resulting in the continuous heat transfer from the first section S1 to the second section S2. This is understood to mean that there continuously exists a temperature difference between the first section S1 and the second section S2.

In an experimental result made for a case where the separation unit 130 is disposed in both the first section S1 and the second section S2, there is continuously observed a temperature difference of 10° C. between the first section S1 and the second section S2.

However, in a case where the separation unit 130 is disposed below only the first section S1 including the heat generation unit 170, there is observed a temperature difference of about 0.3-0.4° C. between the first section S1 and the second section S2.

Such a small temperature difference when the separation unit 130 is disposed below only the first section S1 is made because the wavelength tunable filter 120 discharges heat into the air. Thus, in this case, the temperature difference is made to correspond to a degree in which a portion of the heat generated by the heat generation unit 170 is finely transferred.

The aforementioned temperature difference (e.g., 10° C.) of the wavelength tunable filter causes various issues such as the center wavelength of the wavelength tunable filter continuously being different depending on the position of the wavelength tunable filter.

Unlike the conventional wavelength tunable filter where a heater and a heat drain are formed over the entire outer circumferential surface, the wavelength tunable filter according to an embodiment of the present invention is configured to have the heat generation unit 170 and the separation unit 130 disposed in a minimum surface area.

This makes it possible to keep the temperature of a region(s) through which the light passes uniform, while keeping the heat capacity of the wavelength tunable filter 120 small compared to the conventional filter.

When the heat capacity of a filter is reduced, it can be understood to mean that the heat energy to be consumed to make the same temperature difference is reduced, so that the energy consumption can be reduced.

In addition, by reducing the heat capacity of the wavelength tunable filter, a large temperature difference can be made by a small amount of heat change generated on the wavelength tunable filter and the separation unit having a predetermined thermal conductivity, so that a temperature response rate of the wavelength tunable filter can be faster.

In order to make a large temperature difference with a small heat capacity, the separation unit 130 may be formed of a material such as quartz, glass (soda lime, etc.) having a heat transfer rate of 5° C./W·m or less. The material having zero heat transfer rate may be excluded as it does not physically exist.

A thermoelectric element may be disposed below the separation unit 130. The thermoelectric element serves as a support for supporting the drain and maintains the temperature of a lower part of the separation unit 130 and the temperature inside the optical receiver module at a certain constant level.

The thermoelectric element allows the temperature of the tunable filter to be only controlled by the amount of heat generated by the heater regardless of the external temperature.

Figure 11:
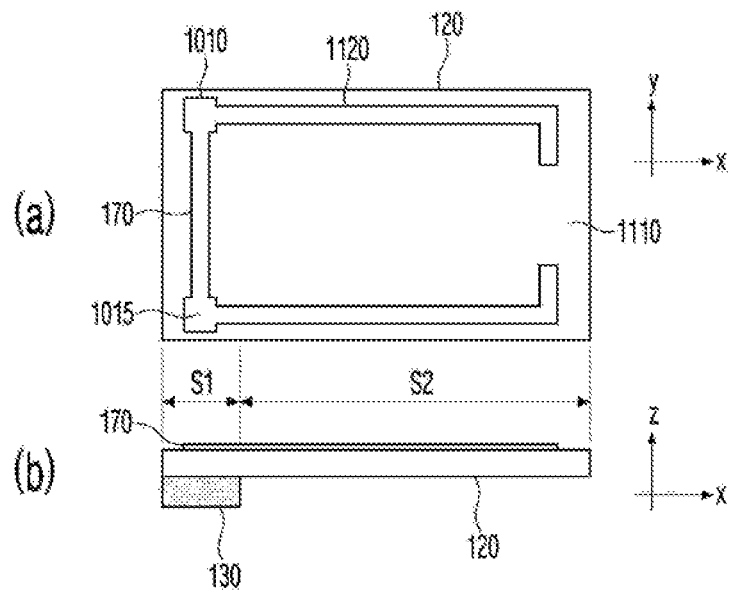
FIG. 11 depicts a plan view and section view of a wavelength tunable filter including a heater according to the sixth embodiment of the present invention.

FIG. 11 depicts a wavelength tunable filter 120 including a heat generation unit 170 according to the sixth embodiment of the present invention. FIG. 11 depicts a wavelength tunable filter 120 including a heat generation unit 170 according to the seventh embodiment of the present invention. The wavelength tunable filter 120 further includes an opening 1110 and a heat transfer unit 1120. The opening 1110 does not include the heat generation unit 170 and is formed in the second section S2. Preferably, the opening 1110 may be formed on an opposite surface to which the drain 200 is coupled.

The heat transfer unit 1120 serves for transferring the heat generated by the heat generation unit 170 to the second section S2 rather than generating the heat using the power supplied through the pads 1010 and 1015. The heat generation unit 170 is defined as a portion between the pads 1010 and 1015 that are electrically connected to the external part.

Generally, since a heater of the heat generation unit is made of metal, and the metal has a high heat transfer rate, the heat generated by the heat generation unit 170 can be quickly transferred to the second section S2 through a metal layer of the heat transfer unit 1120. The heat generation unit 170 includes the heat transfer unit 1120, so that the heat transfer to the second section S2 can be made more quickly.

Since the current supply from the external is only made between the pads 1010 and 1015, the heat is generated only in the heat generation unit 170, and no heat is generated in the heat transfer unit 1120 extending over the second section S2. Accordingly, similar to the fifth embodiment, no heat is generated in the heat transfer unit 1120. Therefore, even if the metal of the heat transfer unit 1120 is located in the second section S2, no heat is generated and no heat is drained in the second section S2, similar to the fifth embodiment.

The heat generation unit 170 according to the sixth to seventh embodiments is formed along with a y-axis direction of the first section S1 as in the fifth embodiment, however unlike the fifth embodiment, the heat transfer unit 1120 according to the sixth to seventh embodiments is formed along with edges in the x-axis direction.

The heat generation unit 170 rapidly increases the temperature in the y-axis direction and transfers heat in the x-axis direction at the same time, thereby reducing the temperature difference between the first section S1 and the second section S2 quickly.

Even in the case of the sixth and seventh embodiments, if the separation unit 130 is formed only in the lower part of the first section S1, the air is only path in which heat can be discharged to the outside from the second section S2. Since the heat generated in the first section S1 is transferred to the separation unit 130, the temperature difference of the wavelength tunable filter 120 can substantially be removed, thus allowing for a fast wavelength tuning speed.

It is described with respect to the fifth through seventh embodiments that the separation unit 130 for maintaining the thermal balance (or equilibrium) is disposed on the lower surface of the wavelength tunable filter. However, the separation unit 130 may be disposed on the upper surface or the side surface of the tunable filter, and can be disposed using a supporting/fixing element such as a bracket. In this case, it is preferable that the separation unit 130 is not disposed in a region (e.g., second section) through which light passes in the tunable filter.

Figure 13:
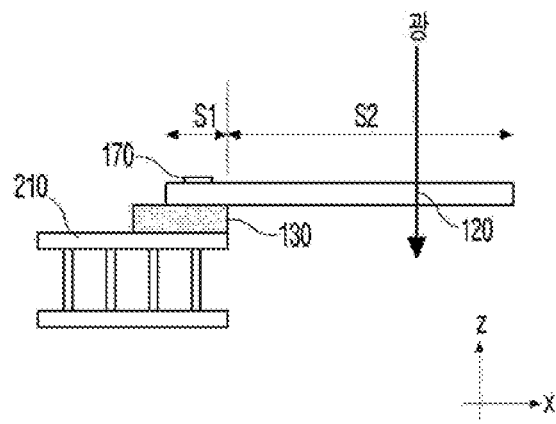
FIG. 13 depicts a section view of an optical receiver device according to the second embodiment including a wavelength tunable filter according to the fifth to seventh embodiments of the present invention.
Figure 14:
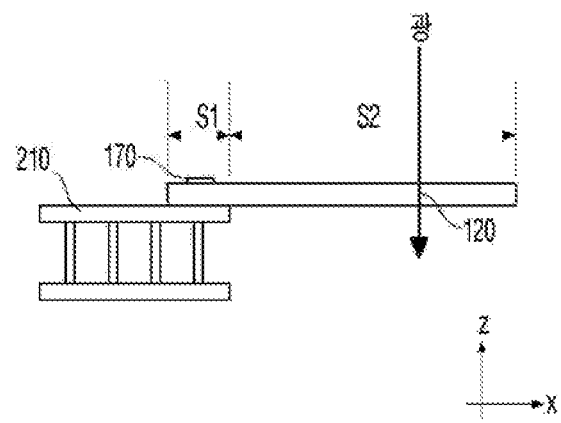
FIG. 14 depicts a section view of an optical receiver device according to the third embodiment including a wavelength tunable filter according to the fifth to seventh embodiments of the present invention.

FIG. 13 depicts a section view of an optical receiver module according to the second embodiment including a wavelength tunable filter according to the fifth to seventh embodiments of the present invention. FIG. 14 depicts a section view of an optical receiver device according to the third embodiment including a wavelength tunable filter according to the fifth to seventh embodiments of the present invention.

The optical receiver module 300 includes a wavelength tunable filter having the heat generation unit 170 above a thermo-electric element 210 and a separation unit 130 thermally coupled to the wavelength tunable filter 120, so that the temperature change on the lower part of the separation unit 130 due to external temperature can be reduced.

Thus, regardless of the external temperature, the optical receiver module 300 can maintain the temperature of the wavelength tunable filter 120 at a certain level using the power supplied to the heat generation unit 170.

In the absence of the thermoelectric element 210, as the external temperature changes, the temperature of the lower part of the separation unit 130, which is in thermal contact with the outside, also changes. Such a temperature change of the lower part of the separation unit 130 results in a temperature change in the upper part of the separation unit 130 and a temperature change of the filter. Accordingly, in maintaining the temperature of the wavelength tunable filter at a certain constant level regardless of the external temperature, there arises difficulties that an amount of the heat generated by the heater must be adjusted to cancel the temperature change of the wavelength tunable filter caused by the external temperature change.

Although the wavelength tunable filter according to one embodiment is exemplary described using an optical receiver, the wavelength tunable filter can be applied to every optical module incorporating a wavelength tunable filter.

In the first section S1, the center wavelength of the wavelength tunable filter 120 is changed by the heat generated by the heat generation unit 170, and thus, the wavelength of light transmitting the wavelength tunable filter 120 can be changed. Although not shown, various optical and electronic elements such as a lens, etc. can be located on the lower surface of the second section S2.

FIG. 13 depicts an optical receiver module in which a separation unit 130 is implemented using a material such as quartz. FIG. 14 depicts an optical receiver module in which a thermoelectric element 210 is directly coupled to the tunable filter 120 without the separation unit 130 such as quartz.

Since a part of the wavelength tunable filter 120 according to an embodiment of the present invention is coupled to the separation unit 130 to make the heat generated by the heat generation unit 170 discharged into the separation unit 130, the temperature deviation of the wavelength tunable filter 120 of the optical receiver module according to an embodiment can be minimized to be more stable.

In addition, the optical receiver module according to an embodiment of the present invention uses the wavelength tunable filter which is thermally separated from other components, thereby allowing for a faster wavelength tuning.

The characteristic that the transmission wavelength of a wavelength tunable filter varies according to temperature thereof generally stems from the fact that the refractive index of a medium constituting the wavelength tunable filter varies over temperature.

Preferably, the wavelength variable filter is transparent to transmitted light, having a large thermal conductivity. In addition, preferably, the wavelength tunable filter has a refractive index which varies largely over temperature. Further, it is preferable that the wavelength tunable filter is implemented using a material, the stability of which does not significantly vary due to the temperature variation.

Examples of the material having a large refractive index change over temperature variation include polymeric materials or semiconductors such as polymers, etc. However, there is a drawback that they have a low material stability over temperature variation.

Examples of materials used for optical communications and transparent to the incident light include silicon and gallium arsenide (GaAs). Particularly, silicon is suitable as a material constituting a filter because of its high rigidity.

Figure 15:
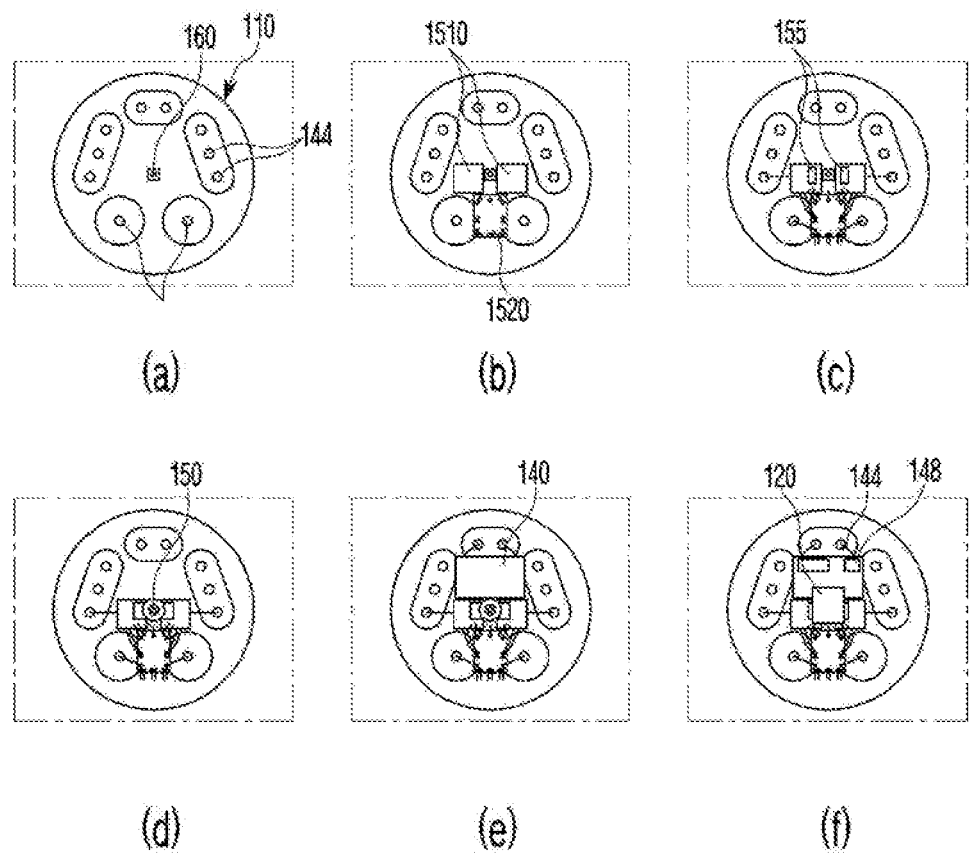
FIG. 15 depicts a view illustrating a process for manufacturing an optical receiver device according to an embodiment of the present invention.

FIG. 15 depicts a view illustrating a process for manufacturing an optical receiver module according to an embodiment of the present invention.

Hereinafter, it is assumed that the optical receiver module is implemented with a TO-CAN type, however embodiments of the present invention are not limited thereto. The optical receiver module is manufactured by mounting optical elements and electronic elements on a stem 110 including a plurality of terminals 114 and 118.

The top surface of the stem 110 is electrically grounded to an external ground terminal via any of the plurality of terminals 114 and 118.

Referring to FIG. 15(a), a photodiode 160 is formed on the upper surface of the stem 110. The photodiode 160 may be implemented with various types of diodes such as PIN, APD, etc. depending on the performance of the WDM system.

Further, since the optical receiver module may be provided with a diameter of several millimeters, it has a narrow internal space. For an optimal use of such a narrow internal space, a position of the photodiode 160 in the optical receiver module is of importance. Although the photodiode 160 is arranged at the center, in this embodiment, the position of the photodiode 160 can be changed as long as other elements can be arranged.

Referring to FIG. 15(b), after the photodiode 160 is formed, a capacitor 1510 and a TIA 1520 are disposed on the upper surface of the stem 110. Since the O/E converted electrical signal through the photodiode 160 has a high data rate, its frequency is high while intensity is low. Thus, amplification of the signal using the TIA 1520 is necessary.

In addition, the TIA 1520 and the photodiode 160 are operated by being supplied with bias power. Unless an appropriate level of bias voltage is supplied to them, the receiver sensitivity of the optical receiver module to the high-data rate signal becomes low.

The distance between the photodiode 160 and the capacitor 1510, the distance between the TIA 1520 and the capacitor 1510, and the distance between the photodiode 160 and the TIA 1520 have a close relationship with the receiver sensitivity. The shorter the distances between the above elements, the better the receiver sensitivity. This is because the longer the wires connecting the respective elements, the less likely the electrical signals received by the elements will be distorted.

The distortions are caused due to bandwidth limitation, parasitic phenomena, etc. in the optical receiver module, and the distortions result in lowering the receiver sensitivity. The TIA 1520, the photodiode 160, and the capacitor 1510 may be coupled through a separate sub-mount(s), or may be directly coupled. Preferably, at least one capacitor 1510 is included, and the capacitor may be disposed around the photodiode 200. The lens 150 allows the photodiode 160 to receive light more efficiently. The lens 150 may be positioned above the photodiode 200.

Referring to FIG. 15(c), the optical receiver module fixes the lens 150 using the lens sub-mount 155. The lens sub-mount 155 may be disposed at various locations, but may be disposed on the top surface of the capacitor 1510, various embodiments with respect to its structure of which are illustrated with reference to FIGS. 18-21.

The reason why the lens sub-mount 155 is disposed is as follows. The capacitor 1510 must be positioned close to the photodiode 160 (e.g., it may be wired-bonded to the photodiode 160 with a minimum distance), In order for the photodiode 160 to receive light, the lens 150 needs to be positioned above the photodiode 160. Therefore, each element is arranged as described above, so that it has an optimum arrangement.

Only one lens sub-mount 155 is incorporated, but if two lens sub-mounts 155 are incorporated, a more stable structure can be achieved. The lens sub-mount 155 separates the lens 150 from the photodiode 160 by a focal length of the lens 150.

Figure 16:
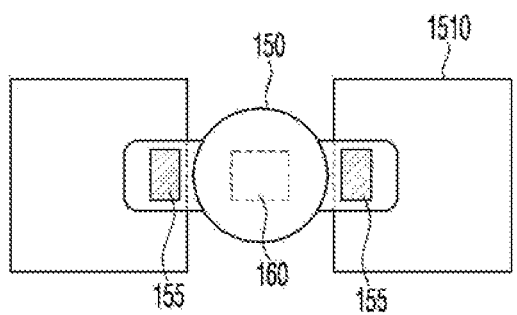
FIG. 16 depicts a plan view of an optical receiver device according to the eighth embodiment of the present invention.
Figure 17:
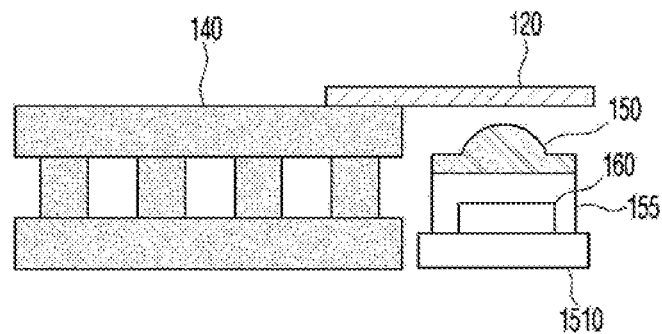
FIG. 17 depicts a front view of the optical receiver device according to the eighth embodiment of the present invention.
Figure 18:
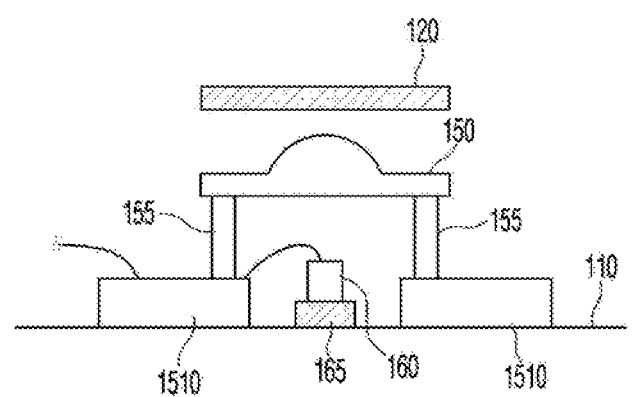
FIG. 18 depicts a side view of the optical receiver device according to the eighth embodiment of the present invention.
Figure 19:
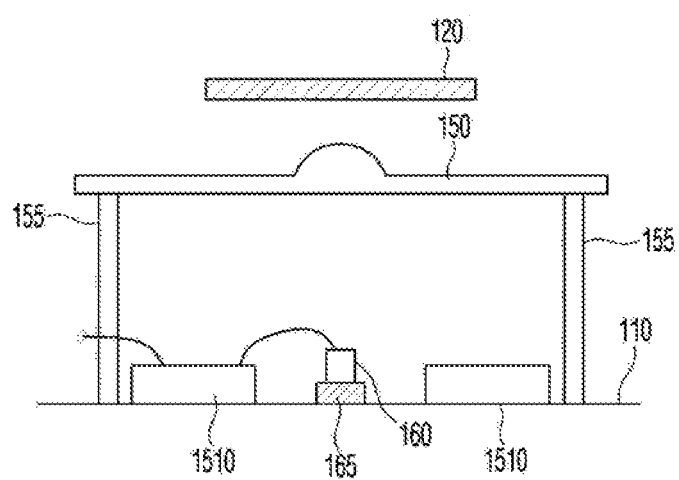
FIG. 19 depicts a side view of an optical receiver device according to the ninth embodiment of the present invention.
Figure 20:
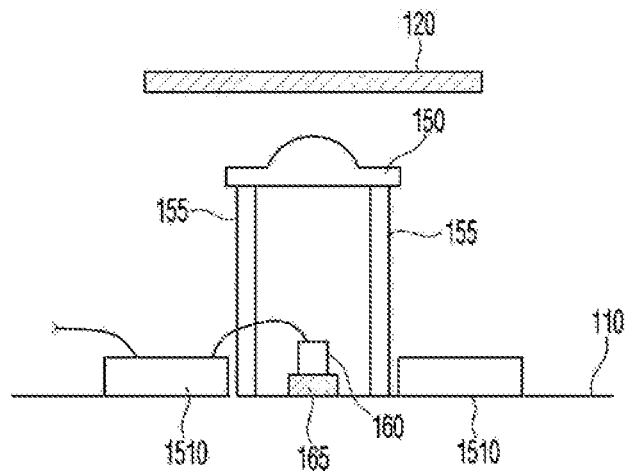
FIG. 20 depicts a side view of an optical receiver device according to the eleventh embodiment of the present invention.
Figure 21:
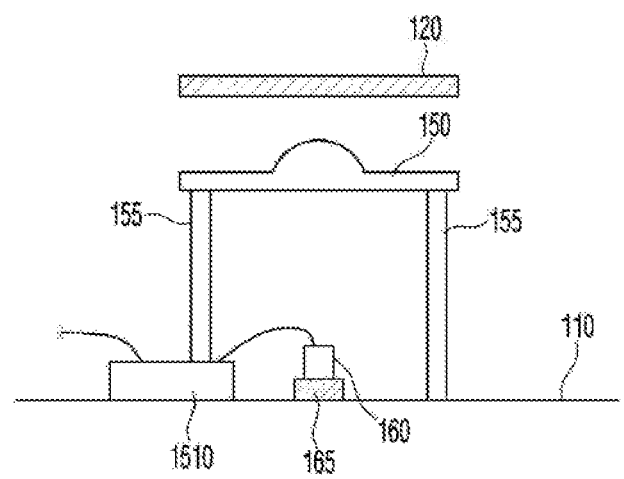

Referring to FIGS. 16 and 17, two lens sub-mounts 155 are disposed on the upper surface of two capacitors, respectively, and the lens 150 is disposed to form a bridge between the two lens sub-mounts 155, so that more stable and efficient structures in terms of spatial perspective can be achieved.

The lens 150 may be directly coupled to the capacitor 1510 when the height of the capacitor 1510 is higher than that of the photodiode 160 without incorporating a separate lens sub-mount 155.

As described above, preferably the TIA 1520 is disposed close to the photodiode 160 and the capacitor 1510. The TIA 1520 is disposed in a region which the photodiode is not formed, and a separate sub-mount (not shown) may be disposed along with the TIA 1520 for insulation or the like. The capacitor 1510 is disposed below the photodiode 160, and the capacitor 1510 and the photodiode 160 are connected to each other through a wire(s).

FIGS. 18 to 21 are various embodiments of the optical receiver module. It is an essential feature of the embodiments of FIGS. 18 to 21 that a capacitor 1510 is disposed around the photodiode 160 and a lens sub-mount 155 is disposed on the top surface of the capacitor 1510 or disposed in the vicinity of the capacity 1510. This is because the length of the wire connecting the photodiode 160 and the capacitor 1510 should be minimized in order to prevent the receiver sensitivity from deteriorating.

In a prior art, the thermoelectric element is disposed below the photodiode. However, in case the thermoelectric element is disposed below the photodiode, the upper portion of the thermoelectric element must be connected to the ground of the stem for providing the ground to the photodiode. In this process, heat exchange may occur between the upper portion of the thermoelectric element 140 and the ground, so that the performance of the thermoelectric element 140 may deteriorate.

In addition, in a prior art, elements such as a photodiode, a lens, a lens mount, a filter, a filter mount, etc. are disposed above the upper portion of thermoelectric elements for spatial efficiency. Such an arrangement of the elements allows the optical receiver module to efficiently use a narrow internal space, which is a great advantage. However, since the elements are disposed on the upper portion of the thermoelectric element, the load of the thermoelectric element for heat control rises, thus resulting in reduction of the heat capacity of the upper portion of the thermoelectric element. Such a structure might not cause an issue in a system where the thermoelectric element is simply controlled based on the external temperature variation or a wavelength tuning speed of the wavelength tunable filter is not at concern. However, this structure might not be inadequate to be used in a system that requires the wavelength tunable filter with a fast wavelength tuning speed.

Referring to FIGS. 15(e) and 15(f), the thermoelectric element 140 and the photodiode 160 are separately disposed, and only a part of the entire surface of the wavelength tunable filter 120 is disposed on the thermoelectric element 140. This arrangement can be made since the capacitor 1510 is disposed next to the photodiode 160, and the lens 150 is disposed over the capacitor 1510 in an overlapping manner 1510 in an overlapping manner.

The wavelength tunable filter 120 is thermally coupled to the thermoelectric element 140, and a separate bonding member (not shown) may be used for the thermal coupling. An adhesive member may be embodied as a material such as epoxy. The adhesive member thermally couples the wavelength tunable filter 120 and the thermoelectric element 140.

The wavelength tunable filter 120 coupled to the thermoelectric element 140 may be disposed in a cantilever shape where only a part of the wavelength tunable filter 120 is coupled to the thermoelectric element 140. That is, only a portion of the wavelength tunable filter 120 is coupled to the thermoelectric element 140, and a part of the remaining portions of the wavelength tunable filter 120 which are not coupled may be disposed to cover the upper portion of the lens 150.

In addition, the thermoelectric element 140 and the wavelength tunable filter 120 may be coupled through a separator (not shown), and a separate heating unit (not shown) may be disposed at a portion of the wavelength tunable filter 120 for the temperature control of the wavelength tunable filter 120.

Therefore, the transmission wavelength of the wavelength tunable filter 120 can be changed according to the temperature variation of the upper portion of the body portion 140. Also, since the heat capacity of the upper portion of the thermoelectric element 140 is only determined by the wavelength tunable filter 120, the response speed to the temperature variation becomes faster, and the temperature change of the wavelength tunable filter 120 also becomes faster.

In addition, in case only a portion of the wavelength tunable filter 120 is coupled to the thermoelectric element 140, thermal uniformity of an optical path over which where light is transmitted can be increased. As in the conventional scheme, if the temperature of a wavelength tunable filter changes over the entire surface (structure where the filter is disposed above the thermoelectric element or a heater is disposed above the filter), there may occur a substantial temperature difference of about 13° C. or more throughout the wavelength tunable filter.

On the other hand, in case of the above structure according to the present invention, the temperature difference over the entire area of the wavelength tunable filter 120 is substantially zero. This is because the heat generated by the thermoelectric element 140 is discharged through the upper portion of a surface through which the thermoelectric element is attached to the wavelength tunable filter 120. That is, the heat is drained in the upward direction, not in other directions through the remaining portions of the tunable filter. A temperature sensor 148 is disposed on the upper portion of the thermoelectric element 140, the temperature of which can be monitored using the temperature sensor 148. Since the temperature sensor-based temperature-monitoring technique is known in the art, description thereof is omitted in the present invention.

It should be noted that in the present invention there is proposed an optical receiver module allowing for a fast wavelength tuning by coupling only the wavelength tunable filter 120 on the upper portion of the body portion 140, and there is proposed a structure where the internal elements of the optical receiver module are arranged, so that high performance can be achieved, while spatial efficiency being maximized.

Figure 22:
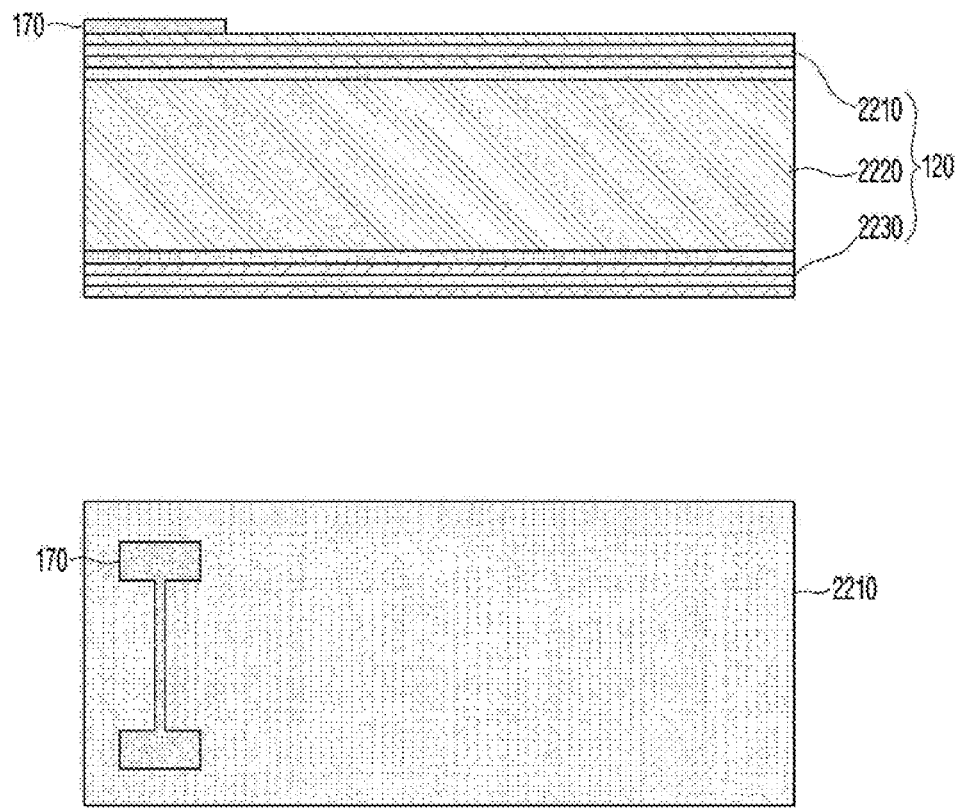

FIG. 22 depicts section views and plan views of a wavelength tunable filter according to a twelfth embodiment of the present invention.

Referring to FIG. 22, the wavelength tunable filter 120 according to the twelfth embodiment of the present invention includes high reflection parts 2210 and 2230 and a medium portion 2220.

The high reflection unit 2210 transmits all optical wavelengths of light being received while reflecting a predetermined ratio of the light. For example, if the predetermined ratio is 90%, the high reflection unit 2210 reflects 90% of the received light and passes only 10% of the light.

On the contrary, if the light that has been transmitted through the high reflection unit 2210 at one end passes through the medium portion 2220 to reach the high reflection unit 2230 at the opposite end, the high reflection portion 2230 reflects 90% of the light back to the high reflection unit 2210 and let 10% of the light be transmitted. As such, the high reflectors 2210 and 2230 continuously reflect a predetermined portion of light, allowing the re-reflected light to continue to pass through the medium portion 2220. At this time, as the re-reflected light continues to pass through the medium portion 2220, the light gets resonated at a predetermined wavelength band. Accordingly, the wavelength tunable filter 120 can pass only the light having a predetermined wavelength band, while filtering the light of the other wavelength band out.

The high reflection portion 2210 is made of a material having a significantly lower thermal conductivity than the medium portion 2220. For example, the high reflection unit 2210 is implemented by alternately arranging silicon dioxide (SiO2) layers having high indices and tantalum pentoxide (Ta2O5) layers having low indices by a predetermined number. However, the present invention is not limited thereto, and the high-reflection portion 2210 may be made of any material whichever has a significantly lower thermal conductivity than the medium portion 2220.

The medium portion 2220 is made of a material having a refractive index different from that of the high reflection portion 2210, and the medium portion 2220 causes resonance of light that is transmitted and reflected through the high reflection portion 2210. The medium portion 2220 can adjust the resonance wavelength of the light based on various factors such as its refractive index, height (e.g., distance between the high reflection portions), temperature, etc. In this case, the resonance wavelength is mainly affected by the temperature of the medium portion 2220. That is, the resonance wavelength can be changed by the temperature of the medium portion 2220 faster than any other factors.

The medium portion 2220 is made of a material having a significantly higher thermal conductivity than each of the high-reflection portions 2210 and 2230. For example, the medium portion 2220 may be made of a silicon substrate, but is not limited thereto.

The medium portion 2220 may be made of a material having a refractive index different from that of each of the high reflective portions 2210 and 2230 and having a significantly higher thermal conductivity than each of the high reflective portions 2210 and 223.

The medium portion 2220 has a high thermal conductivity. Thus, if the heat is once transferred through the high reflection portion 2210, the heat can be transferred to the entire region of the medium portion 2220 at a high speed. Thus, the resonance wavelength band of the light can be changed quickly.

A heat generation unit 170 is disposed on one end of the upper surface of the high reflection portion 2210. The heat generation unit 170 is disposed on one end of the upper surface of the wavelength tunable filter 120, more particularly, the high reflecting portion 2210, so it discharges the heat.

As described above, if the heat generation unit 170 is disposed directly on the wavelength tunable filter 120, the volume of heat generation or heat dissipation made by the heat generating portion is reduced, allowing for changing the temperature of the tunable filter so quickly.

Figure 24:
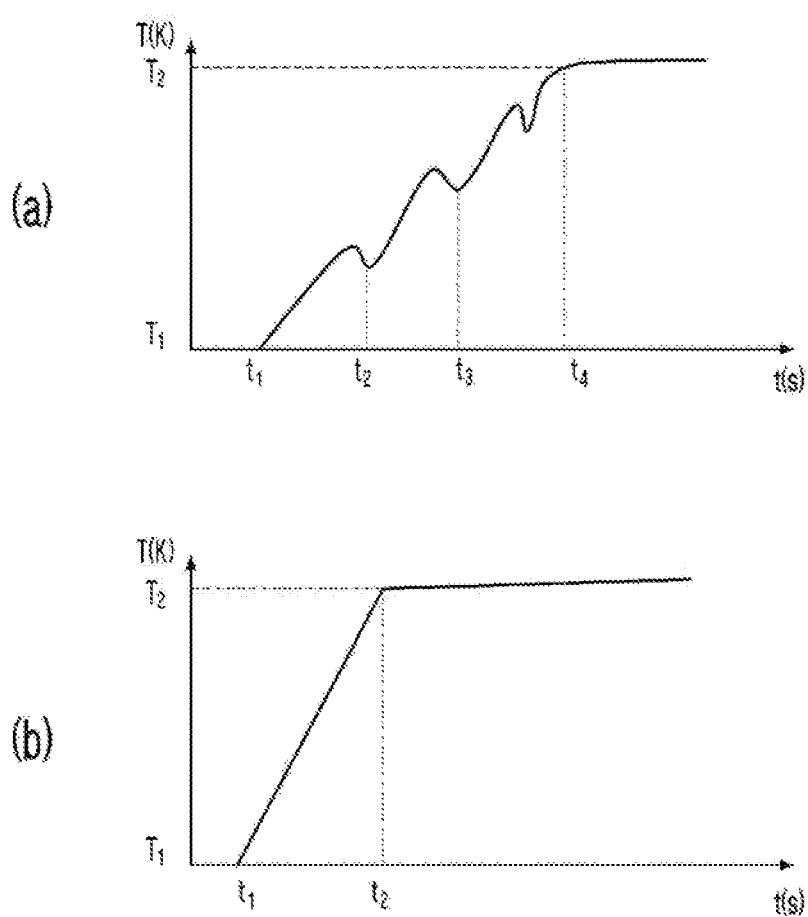

However, as described above, if the high reflection portion 2210 is made of a material having a significantly lower thermal conductivity than the medium portion 2220 and is deposited on both surfaces of the medium portion 2220 having a significantly high thermal conductivity, there occurs temperature variation shown in FIG. 24(a).

FIG. 24(a) is a graph illustrating the temperature variation of the wavelength tunable filter over time according to a twelfth embodiment of the present invention. The x-axis (or horizontal axis) represents time, and the y-axis (or vertical axis) represents temperature of the medium.

The heat generating unit 170 generates heat and transmits the heat to the wavelength tunable filter 120. However, only a significantly low heat is transferred to the medium portion 2220 through the high reflecting unit 2210.

Also, although the temperature of the medium portion 2220 may continuously rise, the heat may be discharged to the upper surface of the high reflector portion 2210 while being transferred to the medium portion 2220 through the high reflector portion 2210. As such, the temperature of the medium portion 2220 may be temporarily lowered, as shown with respect to t2 and t3. Although the temperature can be changed faster than the conventional wavelength tunable filters, the temperature may be changed even faster if such a phenomenon that the temperature gets temporarily lowered is alleviated. In order to alleviate this phenomenon, the wavelength tunable filter can be implemented as shown in FIG. 23.

Figure 23:
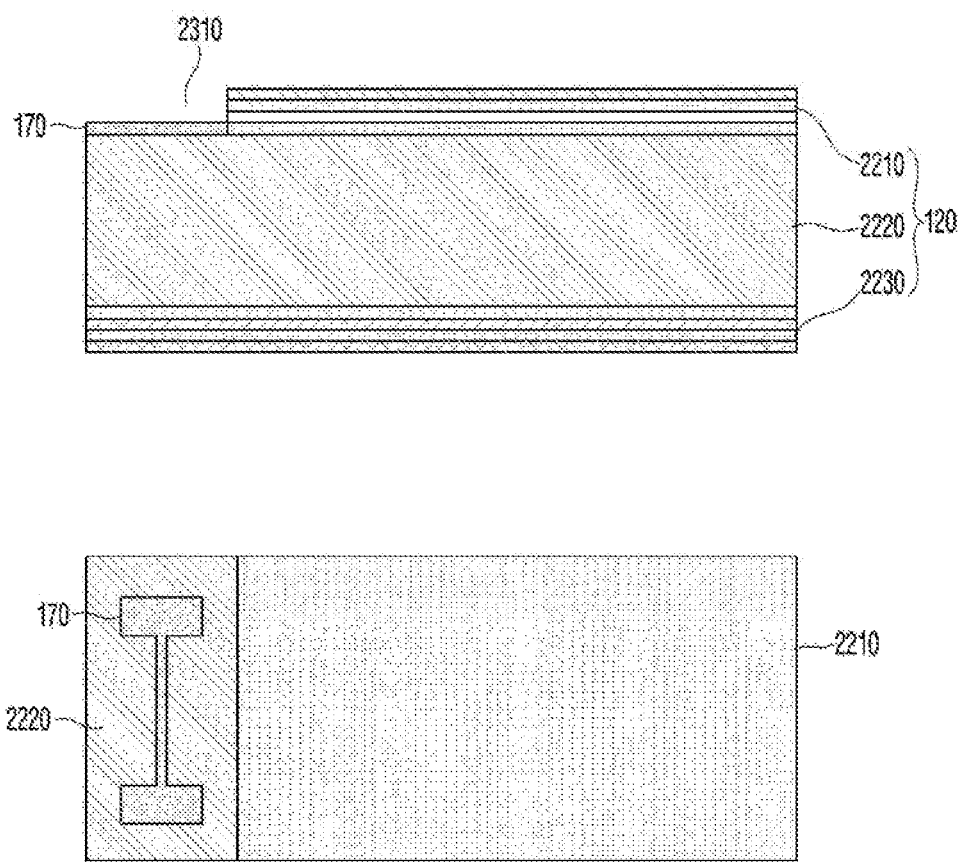

FIG. 23 depicts a cross-sectional view and a plan view of the wavelength tunable filter according to a thirteenth embodiment of the present invention.

Referring to FIG. 23, the wavelength tunable filter 120 according to the thirteenth embodiment of the present invention may further include an end-piece portion 2310 within the high-reflection portion 2210.

The end-piece portion 2310 corresponds to a portion that is etched in a predetermined shape on one end of the high reflection unit 2210. The shape of the end-piece portion 2310 may vary depending on the shape of the heat generation unit 170.

Figure 12:
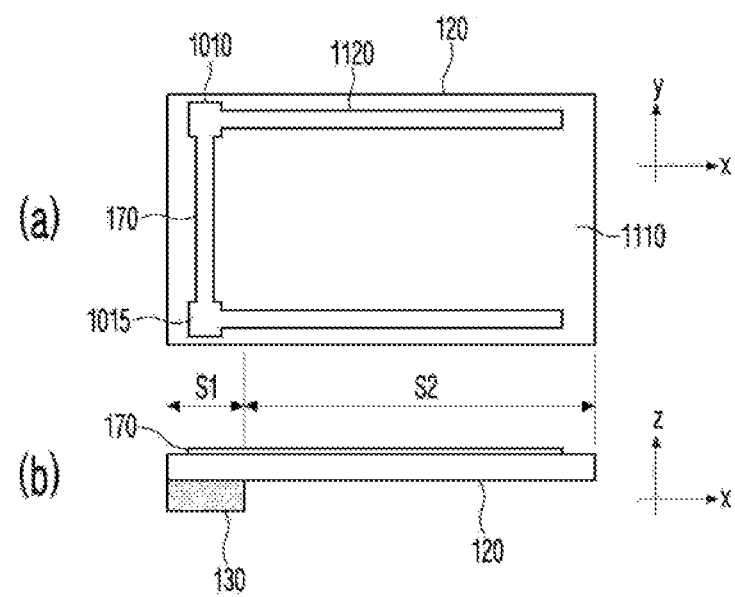
FIG. 12 depicts a plan view and section view of a wavelength tunable filter including a heater according to the seventh embodiment of the present invention.

For example, when the heat generation unit 170 has a shape as shown in FIG. 23, the end-piece portion 2310 can be etched in a square shape including the entire area of the heat generating portion 170 or in the same shape as the heat generation unit. If the heat generation unit 170 has the shape as shown in FIG. 11 or 12, the end-piece portion 2310 can be implemented in the same shape (e.g., 'U') as the heat generation unit 170.

The high reflection portion 2210 includes the end-piece portion 2310 to allow the heat generation unit 170 to directly contact the medium portion 2220 without passing through the high reflection unit 2210. Since the heat generation unit 170 directly contacts the medium portion 2220 through the end-piece portion 2310, the heat generated by the heat generation unit 170 is immediately transferred to the medium portion 2220. This is because the medium portion 2220 is made of a material having a significantly high thermal conductivity. Accordingly, the wavelength tunable filter 120 including the end-piece portion 2310 within the high reflection portion 2210 has a characteristic as shown in FIG. 24(b).

FIG. 24(b) is a graph illustrating temperature variation of the wavelength tunable filter over time according to a thirteenth embodiment of the present invention.

The wavelength tunable filter according to the thirteenth embodiment of the present invention has a faster temperature response characteristic than the wavelength tunable filter according to the twelfth embodiment of the present invention.

Since the heat generation portion 170 directly contacts the medium portion 2220, the wavelength tunable filter according to the thirteenth embodiment has a faster temperature response in increasing the temperature of the medium portion up to a predetermined temperature T2 than the wavelength tunable filter according to the twelfth embodiment of the present invention.

Further, according to the thirteenth embodiment, since the temperature of the medium portion rises quickly, so the temperature of the medium portion does not drop temporarily unlike that of the twelfth embodiment of the present invention.

The optical receiver module according to an embodiment of the present invention may be applied to not only a single product, but also to an optical transceiver module incorporating optical signal receiving features as a part, wired/wireless communication systems, optical communication systems, optical monitoring systems based on WDM scheme, or the like.

Although it is described that each step is sequentially performed in FIG. 5, it is only an example illustration of the technical idea according to an embodiment of the present invention.

In other words, those skilled in the art will appreciate that various modifications, additions and substitutions are possible, without departing from the subject matter and scope of the present invention. Therefore, exemplary aspects of the present disclosure have not been described for limiting purposes. Accordingly, the present invention is not limited to the sequential order described in FIG. 5.

Also, the steps shown in FIG. 5 can be implemented as computer-readable codes on a computer-readable recording medium. The computer-readable recording medium includes all kinds of recording devices in which the computer-readable codes (or data) are stored.

An example of the computer-readable recording medium includes storage medium such as a magnetic storage medium (e.g., ROM, floppy disk, hard disk, etc.), an optical reading medium (e.g., CD-ROM, DVD, etc.), and a carrier wave (e.g., transmission over internet). Further, the computer-readable recording medium may be distributed over the computer systems connected via network to store and execute a code readable by the computer in a distributed manner.

The foregoing description is only illustrative of the technical idea of the present embodiment, those skilled in the art will appreciate that various modifications, additions and substitutions are possible, without departing from the subject matter and scope of this disclosure.

The description of the present invention has been presented for purposes of illustration and description, but is not intended to be exhaustive or limited to the invention in the form disclosed. The scope of protection of the present embodiment should be construed according to the following claims, and all technical ideas within the scope of equivalents should be interpreted as being included in the scope of the present invention.

What is claimed is:

1. An optical receiver module having a wavelength tunable filter whose transmission wavelength or reflective wavelength is tunable, comprising:
 a stem base;
 a body portion configured to: support at least one component included in the optical receiver module; and include a thermo-electric element to maintain a preset temperature regardless of a temperature of the stem base or an external temperature;
 the wavelength tunable filter configured to: transmit light of a preset wavelength; and tune the preset wavelength;
 a heat generation unit in contact with at least a portion of the wavelength tuning filter;
 a separation unit having a preset thermal conductivity, configured to: on one end, be in contact with one portion of the wavelength tunable filter to support the wavelength tunable filter; on another end, be in contact with another portion of the body portion; and thermally separate the wavelength tunable filter from the body portion,
 a lens configured to collect light passing through the wavelength tunable filter; and
 a photodiode disposed above the stem base, configured to receive the light collected through the lens;
 wherein the preset wavelength is determined based on a temperature of the heat generation unit, the wavelength tunable filter comprising:
 a filter configured to pass through a preset wavelength; and
 a heater formed on a portion of an upper surface of the filter,
 wherein light passes through a portion on which the heater is not formed,
 wherein the upper surface of the filter comprises a first section and a second section, the heater is formed in the first section and the second section,
 wherein the second section comprises an opening, and
 wherein the heater is not formed on the opening.

2. A wavelength tunable filter, a transmission wavelength of which is
 tuned based on heat, comprising:
 a filter configured to pass through a preset wavelength; and
 a heater formed on a portion of an upper surface of the filter,
 wherein light passes through a portion on which the heater is not formed,
 wherein the upper surface of the filter comprises a first section and a second section, the heater is formed in the first section and the second section,
 wherein the second section comprises an opening, and
 wherein the heater is not formed on the opening.

3. The wavelength tunable filter of claim 2, further comprising a drain, at least one portion of which is thermally coupled to the filter.

4. An optical receiver, comprising:
 a stem;
 a photodiode positioned above an upper surface of the stem;
 at least one capacitor positioned in the vicinity of the photodiode;
 an amplifier positioned in the vicinity of the photodiode and the at least one capacitor;
 a lens positioned above the photodiode;
 at least one lens sub-mount positioned above the at least one capacitor, configured to space apart the lens from the photodiode by a focal length of the lens;
 a thermo-electric element spaced apart from the photodiode;
 a wavelength tunable filter arranged in a cantilever shape, only a portion of the entire surface of the wavelength tunable filter is disposed on an upper surface of the thermo-electric element,
 wherein the lens is arranged to be bridged to the at least one lens sub-mounts.

* * * * *